US012308512B2

(12) United States Patent
Pan et al.

(10) Patent No.: US 12,308,512 B2
(45) Date of Patent: May 20, 2025

(54) RECONFIGURABLE ANTENNA SYSTEM FOR A COMMUNICATION DEVICE WITH EXPANDABLE FORM FACTOR

(71) Applicant: MOTOROLA MOBILITY LLC, Wilmington, DE (US)

(72) Inventors: Xuyuan Pan, Chicago, IL (US); Md Faisal Abedin, Lake Bluff, IL (US); Mohammed Abdul-Gaffoor, Palatine, IL (US); Junsheng Zhao, Vernon Hills, IL (US); Mohammadreza Ranjbar Naeini, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 467 days.

(21) Appl. No.: 18/046,894

(22) Filed: Oct. 14, 2022

(65) Prior Publication Data

US 2024/0128637 A1  Apr. 18, 2024

(51) Int. Cl.
*H04M 1/05* (2006.01)
*H01Q 1/10* (2006.01)
*H01Q 1/24* (2006.01)
*H01Q 5/307* (2015.01)
*H01Q 7/00* (2006.01)
(Continued)

(52) U.S. Cl.
CPC ........... *H01Q 1/243* (2013.01); *H01Q 1/10* (2013.01); *H01Q 5/307* (2015.01); *H01Q 7/00* (2013.01); *H01Q 9/0421* (2013.01); *H04M 1/0237* (2013.01); *H04M 1/026* (2013.01); *H04M 1/0268* (2013.01)

(58) Field of Classification Search
CPC .......... H01Q 1/243; H01Q 5/307; H01Q 1/10; H01Q 7/00; H01Q 9/0421; H04M 1/0237; H04M 1/026; H04M 1/0268

USPC ....................................................... 455/575.4
See application file for complete search history.

(56) References Cited

U.S. PATENT DOCUMENTS

2022/0183173 A1* 6/2022 Kim ..................... H05K 9/0084
2022/0329278 A1* 10/2022 Yoon ..................... H01Q 21/28
2024/0097315 A1* 3/2024 Kim ....................... H01Q 21/28

OTHER PUBLICATIONS

IP.com search history (Year: 2025).*
ProQuest search history (Year: 2025).*

* cited by examiner

Primary Examiner — Moustapha Diaby
(74) Attorney, Agent, or Firm — Isidore PLLC

(57) ABSTRACT

A communication device provides a communication provide a multi-band antenna assembly incorporated into a telescoping support structure that is positionable between a compact arrangement and an extended arrangement. The antenna assembly includes at least one antenna having one antenna element that moves with an end portion of the telescoping support structure and another antenna element at an intermediate portion of the telescoping support structure that moves relative to the end portion. The two antenna elements are electromagnetically or conductively coupled to transceive radio frequency (RF) communication bands and add lower band(s) when the telescoping support structure is in the extended arrangement that are not supported when the telescoping support structure is in the compact arrangement. The communication device includes an antenna switching mechanism that configures the antenna assembly to support transceiving by transceiver(s) according to RF communication bands supported by a position of the telescoping support structure.

20 Claims, 16 Drawing Sheets

(51) Int. Cl.
*H01Q 9/04* (2006.01)
*H04M 1/02* (2006.01)
*H04M 1/23* (2006.01)

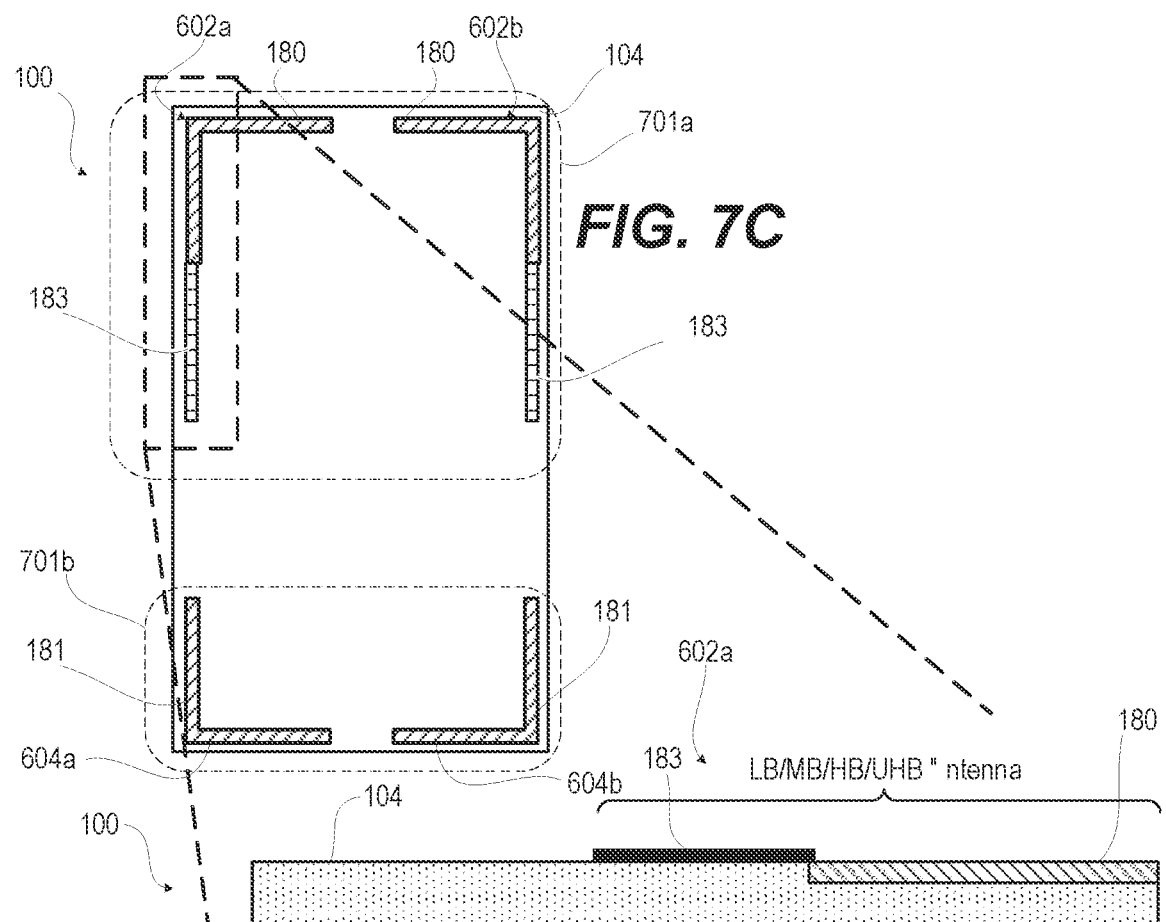

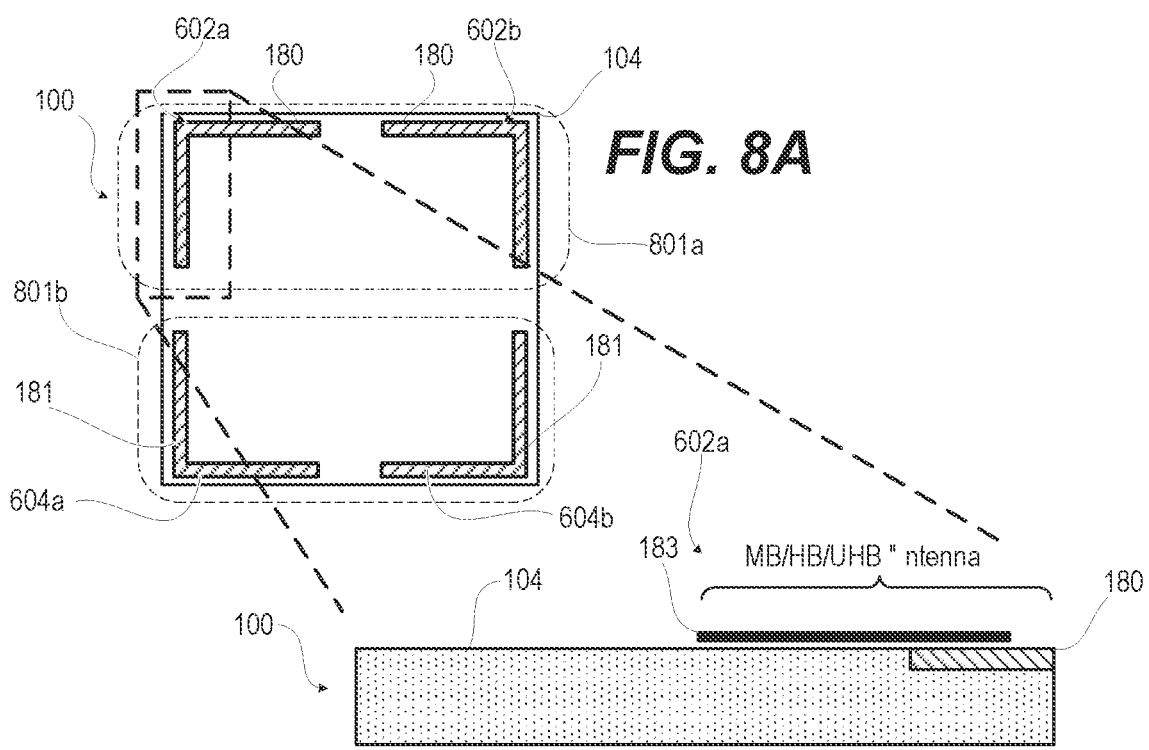

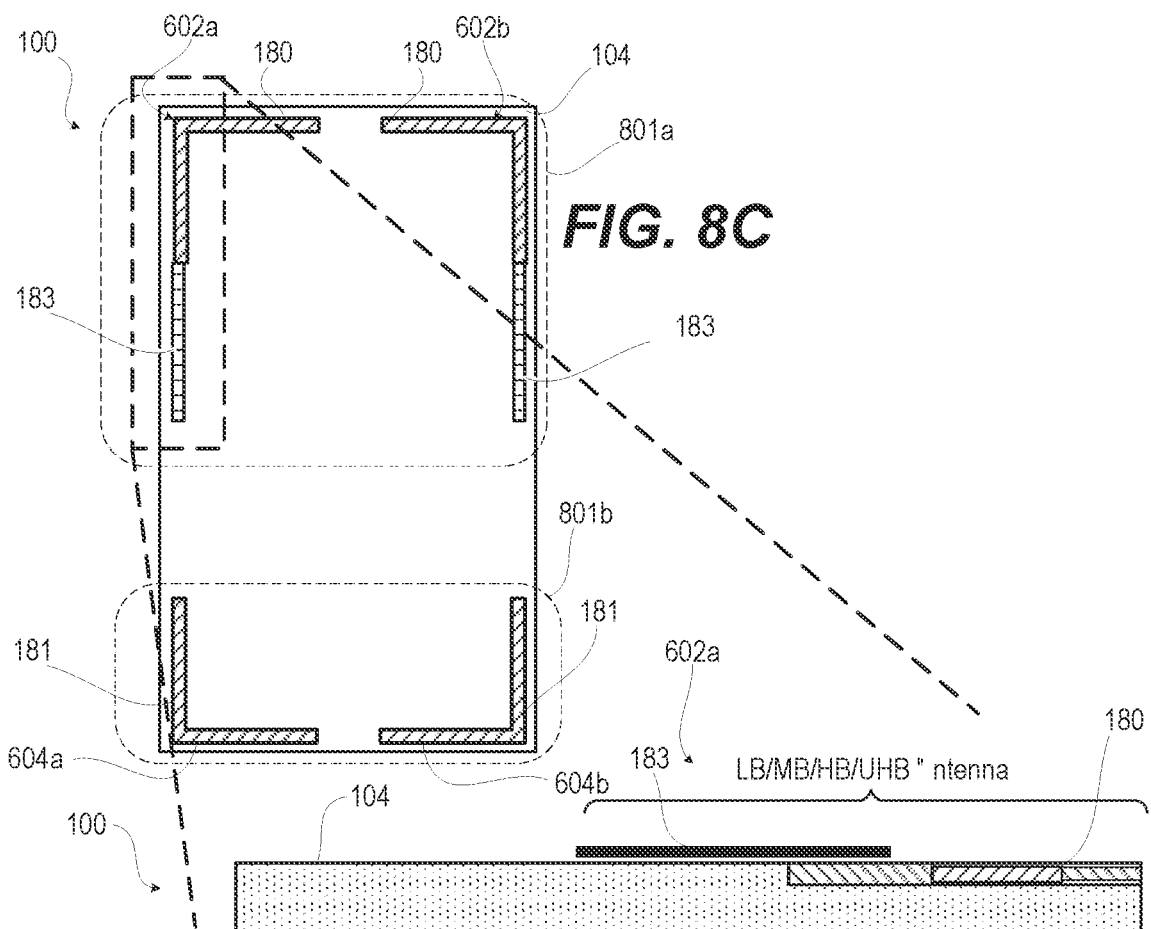

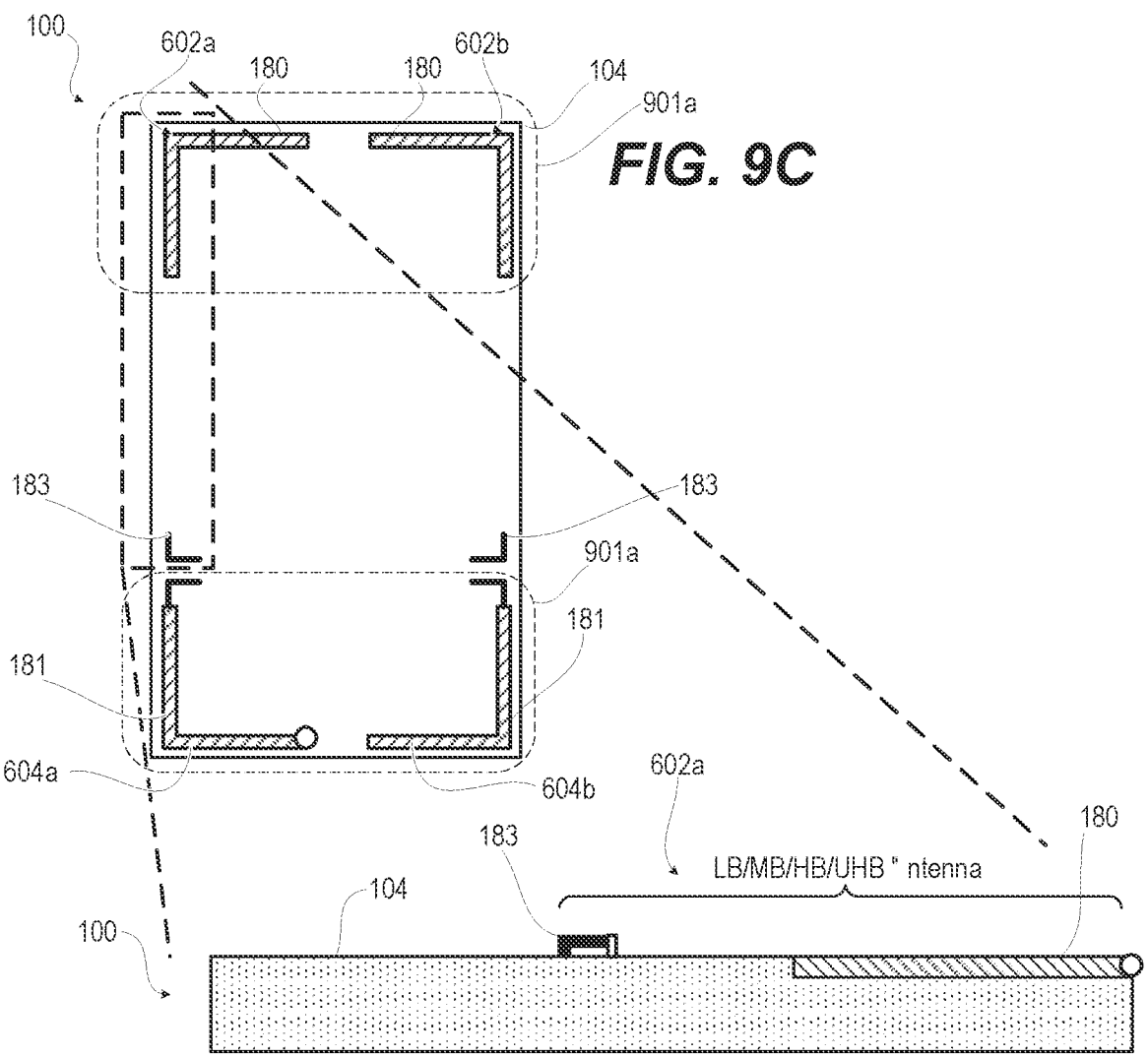

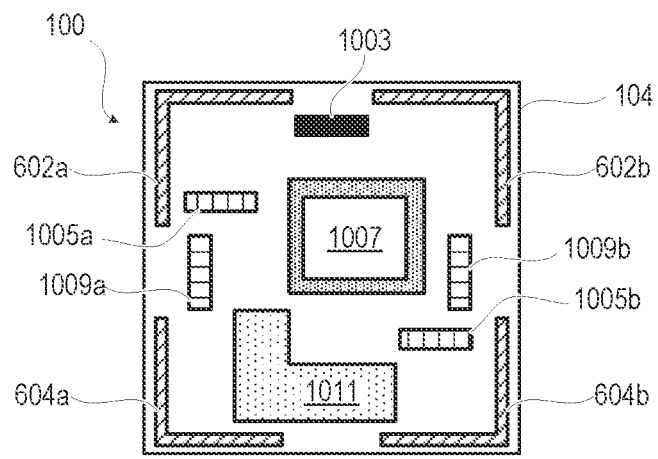
FIG. 10A
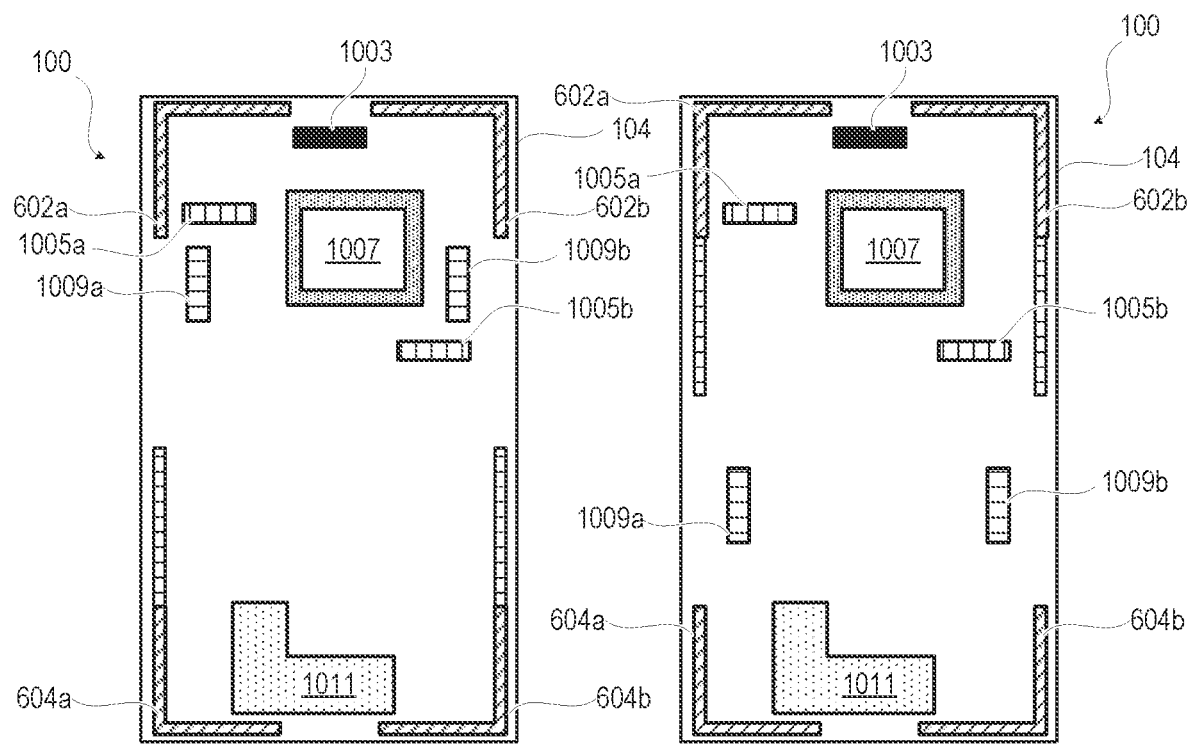
FIG. 10B         FIG. 10C

RECONFIGURABLE ANTENNA SYSTEM FOR A COMMUNICATION DEVICE WITH EXPANDABLE FORM FACTOR

BACKGROUND

1. Technical Field

The present disclosure relates generally to a communication device having an antenna assembly that supports multi-band and multi-spatial communications, and more particularly to a communication device having an expandable form factor that supports multi-band/multi-spatial communications.

2. Description of the Related Art

Mobile communication devices such as smartphones provide a large amount of functionality in a small form factor. The small size enables mobility but limits available space for antennas. To support increased data throughput for functions such as media streaming, mobile communication devices are incorporating millimeter wave (mmWave) communication subsystems to support upper bands allocated to fifth generation (5G) new radio (NR) technologies. The higher frequencies can inherently support greater data speeds. However, the mmWave signals are also inherently more directional as compared to lower radio frequency (RF) bandwidths used for fourth generation (4G) technologies such as the 3rd Generation Partnership Project (3GPP) long term evolution (LTE). Presenting antennas in all required directions is difficult within the form factor of small mobile communication devices that are hand carried or stowed in a pocket. In addition, the mobile communication device requires continued support for legacy communication protocols. Antennas are needed to support communications in multiple radio frequency (RF) communication bands such as: (i) low band (LB) (e.g., ≤1 GHz); (ii) medium band (MB) (e.g., 1.7 to 2.2 GHz); (iii) high band (HB) (e.g., 2.3 to 2.7 GHz); (iv) ultra-high band (UHB) (e.g., 3.3 to 5 GHz); and (v) millimeter wave (mmWave) band (e.g., ≥24 GHz). A plurality of antennas that are placed at spaced-apart positions are required to provide support for spatial diversity, multiple input multiple output (MIMO) operation, and concurrent communications, including for carrier aggregation and transmit diversity.

Typical handheld communication devices have a "candy bar" form factor with limited areas for antenna due to a front surface typically devoted to a display and not to antennas. Communication devices that have a form factor with a movable section, such as flip, slider and swivel form factors, are also available and provide easier stowing. With the introduction of a flexible display, communication devices are being introduced with a rollable or a scrollable form factor. A structure of the communication device extends on one or two ends to support a larger portion of the flexible display on one surface, such as a front side. When a more compact arrangement is desired with the one or two ends retracted, an excess portion of the flexible display is rolled onto an opposite side of the structure or scrolled into an end spool. The changing form factor of rollable and scrollable communication devices limits placement of antennas to support the needed communication bands and spaced arrangement required for higher band radio access technologies (RATs).

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7C is a top view of the example communication device of FIG. 7A in a top expanded arrangement of a top pair of four corner multiband antennas that are mechanically reconfigured to provide end-to-end contact, according to one or more embodiments;

FIG. 7D is a side detail view of one of the upper antennas of the example communication device of FIG. 7C in the expanded arrangement, according to one or more embodiments;

FIG. 8A is a top view of an example communication device in a compact arrangement with a top pair of four corner multiband antennas that are mechanically reconfigurable with a controllable gap, according to one or more embodiments;

FIG. 8B is a side detail view of one of the upper antennas of the example communication device of FIG. 8A in the compact arrangement, according to one or more embodiments;

FIG. 8C is a top view of the example communication device of FIG. 8A in a top expanded arrangement of a top pair of four corner multiband antennas that are mechanically reconfigurable with a controllable gap, according to one or more embodiments;

FIG. 8D is a side detail view of one of the upper antennas of the example communication device of FIG. 8C in the expanded arrangement, according to one or more embodiments;

FIG. 9C is a top view of the example communication device of FIG. 9A in a top expanded arrangement of a top pair of four corner multiband antennas that are mechanically reconfigurable by a space between the two antenna elements, according to one or more embodiments;

FIG. 9D is a side detail view of one of the upper antennas of the example communication device of FIG. 9C in the expanded arrangement, according to one or more embodiments;

FIG. 10A is a top view of an example communication device in a compact arrangement with four corner multiband antennas and having other communication antennas positioned for communication, according to one or more embodiments;

FIG. 10B is a front view of an example communication device of FIG. 10A in a bottom expanded arrangement that lengthens a bottom pair of multi-band antennas to add lower frequency band operation, according to one or more embodiments;

FIG. 10C is a front view of an example communication device of FIG. 10A in a top expanded arrangement that lengthens a top pair of multi-band antennas to add lower frequency band operation, according to one or more embodiments;

DETAILED DESCRIPTION

Figure 1:
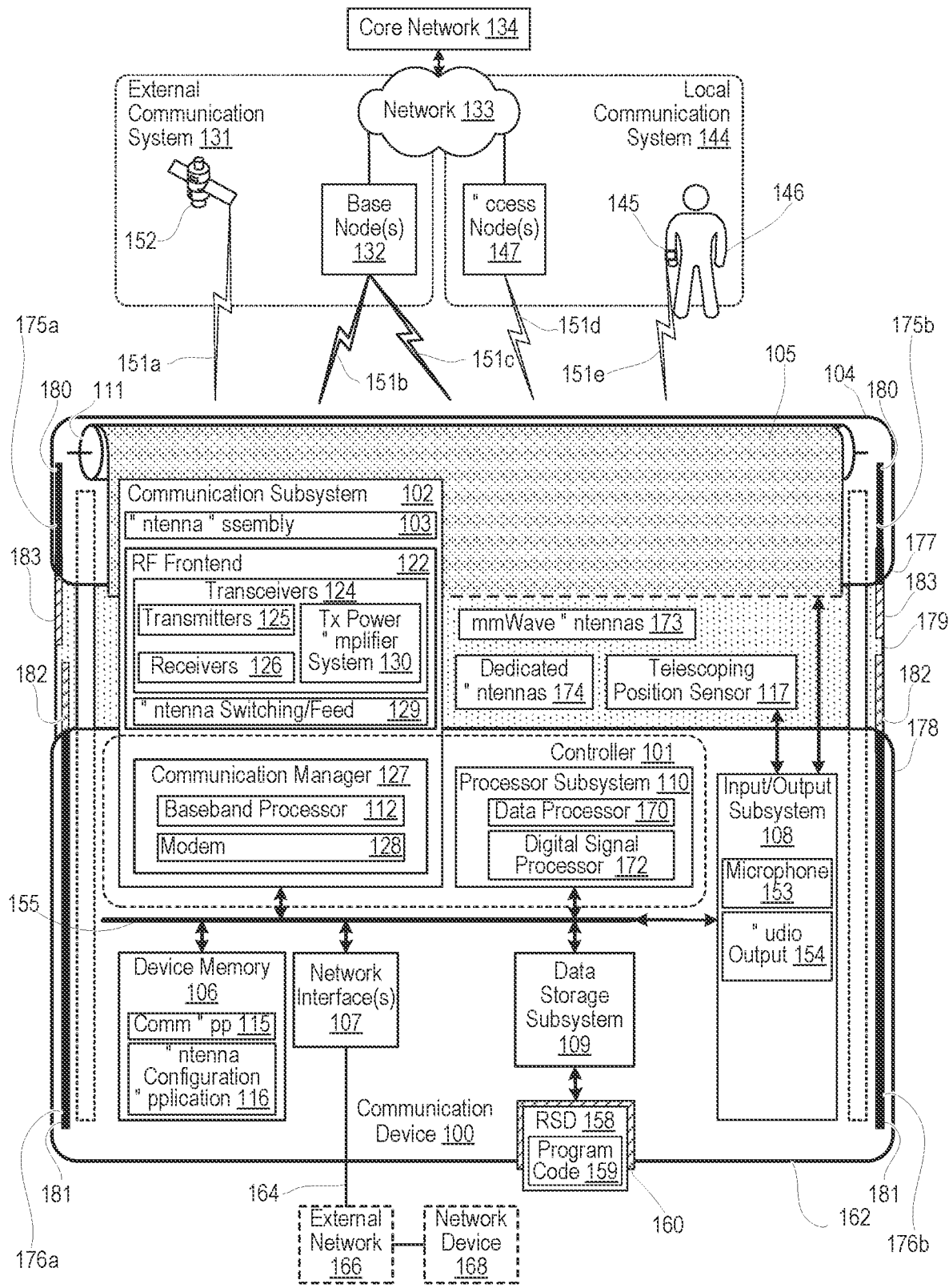
FIG. 1 depicts a functional block diagram of a communication environment including a communication device having an antenna assembly incorporated into a telescoping support structure for rollable or scrollable flexible display, according to one or more embodiments.

According to a first aspect of the present disclosure, a communication device and a method of making the communication device provide an antenna subsystem that is configurable within a telescoping support structure. The telescoping support structure includes a first end portion at one end, a second end portion at an opposite end to the first end portion, and an intermediate portion that slidingly engages the second end portion. The intermediate portion bridges a gap between the first and the second end portions when the second end portion is moved away from the first end portion from at least a compact arrangement to a first extended arrangement. The antenna assembly includes at least one first antenna having at least one first antenna element that moves with the first end portion and that supports one or more radio frequency (RF) communication bands. The antenna assembly includes at least one second antenna having at least one second antenna element that moves with the second end portion and at least one third antenna element at the intermediate portion that is electromagnetically coupled to or electrical conductively contact with the second antenna element. The at least one second antenna transceives one or more RF communication bands in the compact arrangement. The at least one second antenna adds one or more lower RF communication bands when the telescoping support structure is in the first extended arrangement. The added one or more lower RF communication bands are not supported when the telescoping support structure is in the compact arrangement. The communication device includes one or more transceivers configurable to transceive in two or more RF communication bands. The communication device includes an antenna switching mechanism that configures the antenna assembly to support transceiving by the one or more transceivers according to supported RF communication bands while the telescoping support structure is in a corresponding one of the compact arrangement and the first extended arrangement.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of communication device 100 in an operating environment within which the features of the present disclosure are advantageously implemented. In particular, communication device 100, managed by controller 101, has communication subsystem 102 with antenna assembly 103. Antenna assembly 103 supports communication in multiple radio frequency (RF) bands and supports simultaneous or switched communication between multiple antenna in the same RF for spatial diversity or multiple input multiple out MIMO operation. Telescoping support structure 104 of communication device is positionable between a compact arrangement such as for stowage and an extended arrangement that mechanically reconfigures antenna assembly 103 to support one or more lower RF communication bands. In one or more embodiments, flexible display 105 rolls or scrolls on rolling/scrolling member 111 to correspond to a length of telescoping support structure 104.

Communication device 100 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to controller 101 and communication subsystem 102, communication device 100 includes device memory 106, network interface(s) 107, input/output (I/O) subsystem 108, and data storage subsystem 109 that are each managed by controller 101. Controller 101 may include or consist essentially of processor subsystem 110. In one or more embodiments, controller 101 also includes one or more baseband processors 112 of communication subsystem 102. Device memory 106 stores program code for applications, such as communication application 115, antenna configuration application 116, and other application(s). Device memory 106 further includes an operating system (OS), a firmware interface, such as basic input/output system (BIOS) or Uniform Extensible Firmware Interface (UEFI), and firmware.

Controller 101 includes processor subsystem 110, which executes program code to provide operating functionality of communication device 100. The functionality includes configuring communication subsystem 102 for communication using a mechanically reconfigurable antenna assembly 103. The software and/or firmware modules have varying functionality when their corresponding program code is executed by processor subsystem 110 or secondary processing devices within communication device 100. Processor subsystem 110 of controller 101 can execute program code of communication application 115, antenna configuration application 116 and other application(s) to configure communication device 100 to perform specific functions. Device memory 106 can include data used by the applications. Antenna configuration application 116 monitors communication application 115 to determine what communication bands are required and monitors antenna assembly 103 and/or telescoping position sensor 117 to determine what communication bands are supported. Controller 101, executing antenna configuration application 116, can configure communication subsystem 102 to select available antennas of antenna assembly 103 to support communication application 115.

RF frontend 122 of communication subsystem 102 has one or more transceivers 124 that includes one or more transmitters 125 and one or more receivers 126. Communication manager 127 include baseband processor 112 and one or more modems 128. RF frontend 122 includes antenna switching and feed networks 129 to connect particular antennas of antenna assembly 103 at a selected phase delay and in particular combinations. Power amplifier systems 130 of RF frontend 122 set the transmit power levels provided to antennas connected by antenna switching and feed networks 129.

Baseband processors 112 communicates with controller 101 and RF frontend 122. In one or more embodiments, baseband processors 112 perform a primary or support function as part of controller 101. Communication subsystem 102 communicates with external communication system 131. Baseband processor 112 operates in baseband frequency range to encode data for transmission and decode received data, according to a communication protocol. Baseband modems 128 modulate baseband encoded data from corresponding communication manager 127 onto a carrier signal to provide a transmit signal that is amplified by power amplifiers in transmitters 125 and delivered to antennas. Baseband modems 128 encode uplink signals and decode downlink signals that are communicated. Baseband modems 128 demodulate received signals from external communication system 131 detected by antenna assembly 103. The received signal is amplified and filtered by receivers 126, which demodulate received encoded data from a received carrier signal. In an example, communication subsystem communicates with cellular network or base nodes 132 that are part of one or more radio access network (RANs) to connect to communication network(s) 133. Communication network(s) 133 may be communicatively connected to core network 134.

Antenna assembly 103 supports communication with local communication system 144. Local communication system 144 can include localized or personal devices 145, such as a wireless headset, head mounted display, and a smart watch worn by user 146. Local communication systems 144 can further include access nodes 147 for wireless communication. Communication devices 100 can be provided communication services by wide area network(s) that are part of external communication system 131 and linked to access nodes 147. Wide area network(s) may also provide data services to communication network(s) 133 that provide communication service to communication device 100 via base nodes 132.

Communication subsystem 102 can concurrently transmit multiple uplink channels and receive multiple downlink channels. In an example, communication subsystem 102 receives satellite broadcast signals 151a from GPS satellites 152. Communication subsystem 102 communicates with base nodes 132 via uplink/downlink channels 151b-151c. Communication subsystem 102 can communicate with access node 147 via transmit/receive signals 151d. Communication subsystem 102 communicates with localized or personal device 145 via transmit/receive signals 151e.

In one or more embodiments, controller 101, via communication subsystem 102, performs multiple types of cellular over-the-air (OTA) or wireless communication with external communication system 131. Communication subsystem 110 can communicate via Bluetooth connection with one or more personal access network (PAN) devices such as localized or personal devices 145. Communication via Bluetooth connection includes both transmission and reception via a Bluetooth transceiver device. In one or more embodiments, communication subsystem 102 communicates with one or more locally networked devices via a wireless local area network (WLAN) link provided by access node 147. In one or more embodiments, access node 147 supports communication using one or more IEEE 802.11 WLAN protocols (e.g., "Wi-Fi"). Access node 147 is connected to wide area network(s), such as the Internet. In one or more embodiments, communication subsystem 102 communicates with GPS satellites 152 to obtain geospatial location information.

Data storage subsystem 109 of communication device 100 includes data storage device(s). Controller 101 is communicatively connected, via system interlink 155, to data storage device(s). Data storage subsystem 109 provides applications, program code, and stored data on nonvolatile storage that is accessible by controller 101. For example, data storage subsystem 109 can provide a selection of applications and computer data such as antenna configuration application 116. Antenna configuration application 116 can be loaded into device memory 106 for execution by controller 101. In one or more embodiments, data storage device(s) can include hard disk drives (HDDs), optical disk drives, and/or solid-state drives (SSDs), etc. Data storage subsystem 109 of communication device 100 can include one or more non-transitory computer readable storage devices or computer readable storage devices, such as removable storage device (RSD) 158 that contains program code 159 and that is received in RSD interface 160. Controller 101 is communicatively connected to RSD 158, via system interlink 155 and RSD interface 160. Controller 101 can access RSD 158 to provision communication device 100 with program code 159, such as code for antenna configuration application 116 and related computer data, that when executed by controller 101 configures computer device 100 to perform functionality described herein.

I/O subsystem 108 includes user interface components such as flexible display 105 that presents a user interface. I/O subsystem 108 may include acceleration/movement sensor(s), vibration output device, light output device, image capturing device(s), microphone 153, touch/haptic controls, and audio output device(s) 154. I/O subsystem 108 also may include an I/O controller. The I/O controller provides communication and power signals to functional components described herein as part of communication subsystem 102, device memory 106, I/O subsystem 108, or data storage subsystem 109. The I/O controller connects to internal devices, which are internal to housing 162 that includes at least telescoping support structure 104. The I/O controller connects via an electrical cable to tethered peripheral devices, which are external to telescoping support structure 104 of communication device 100. Internal devices can include computing, storage, communication, or sensing components depicted within housing 162. The I/O controller supports the necessary configuration of connectors, electrical power, communication protocols, and data buffering to act as an interface between internal devices and peripheral devices tethered by the electrical cable and other components of communication device 100 that use a different configuration for inputs and outputs.

Network interface(s) 107 can include a network interface controller (NIC) with a network connection/cable 164 connection to external network 166. Network connection/cable 164 may include wireless and/or wired links. Network interface(s) 107 support one or more network communication protocols. External network 166 can be a local area network (LAN), a campus area network (CAN), a metropolitan area network (MAN), or a wide area network (WAN). For example, network connection/cable 164 can be an Ethernet connection/cable. Network device 168 is communicatively coupled to external network 166.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 110, which includes one or more central processing units (CPUs), depicted as data processor 170. Processor subsystem 110 can include one or more digital signal processors 172 that are integrated with data processor 170. Processor subsystem 110 can include other processors that are communicatively coupled to data processor 170, such as baseband processors 112 of corresponding communication managers 127. In one or embodiments that are not depicted, controller 101 can further include distributed processing and control components that are external to telescoping support structure 104 or grouped with other components, such as I/O subsystem 108. Data processor 170 is communicatively coupled, via system interlink 155, to device memory 106. In one or more embodiments, data processor 170 is communicatively coupled via system interlink 155 to communication subsystem 102, I/O subsystem 108, and data storage subsystem 109.

System interlink 155 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 155 are illustrated in FIG. 1, it is to be understood that more, fewer, or different interconnections may be present in other embodiments.

According to aspects of the present disclosure, antenna assembly 103 supports various RF bands for wireless and cellular services in or more of low band (LB), medium band (MB), high band (HB), and ultra-high band (UHB) using multi-band antennas described below. In addition, antenna assembly 103 includes millimeter wave band (mmWave) antennas 173 to support newer radio access technologies (RATs). To support multi band operation, antenna assembly 103 may be configured for dual low band (2L) or quad low band (4L) multiple input multiple output (MIMO) operation that dictates that multiple antennas communicate on multiple bands simultaneously. Antenna assembly 103 enables spatial diversity by positioning multi-band or dedicated antennas at spaced apart locations to mitigate antenna blocking by a hand or head of user. Antenna assembly 103 includes dedicated antennas 174 to support certain types of communication, such as: (i) global positioning system (GPS) signals; (ii) IEEE 802.11 WLAN protocols (e.g., "Wi-Fi"); (iii) ultra-wideband (UWB); and (iv) near field communication (NFC).

In one or more embodiments, four (4) multi-band antennas of antenna assembly 103 are positioned at four corners of telescoping support structure 104: (i) upper left multi-band antenna 175a; (ii) upper right multi-band antenna 175b; (ii) lower left multi-band antenna 176a; and (iv) lower right multi-band antenna 176b. Telescoping support structure 104 includes first end portion 177 at one end, such as the top of communication device 100, a second end portion 178 at an opposite end to first end portion 177, and intermediate portion 179 that slidingly engages one or both of first and second end portions 177-178. Intermediate portion 179 bridges a gap between first and second end portions 177-178 when first and second end portions 177-178 are moved apart from at least a compact arrangement to an extended arrangement. Changing the positioning of telescoping support structure 104 mechanically reconfigures antenna assembly 103. In an example, upper left and right multi-band antennas 175a-175b each include first antenna element 180 on respective lateral sides of top end portion 177 that moves away from lower left and right multi-band antennas 176a-176b, which generally increases antenna isolation and thus improves antenna performance. In another example, some antennas, such as mmWave antennas 173 or dedicated antennas 174 positioned at intermediate portion 179, may be obstructed by one or both of top and bottom end portions 177-178 while telescoping support structure 104 is in the compact arrangement.

In an additional example, antenna assembly 103 may be mechanically reconfigured by changing the length or antenna configuration of one or more antennas by having antenna elements moving independently with intermediate portion 179 and one of top and bottom end portions 177-178. Lower left and right multi-band antennas 176a-176b each include second antenna element 181 on second end portion 178 and third antenna element 182 on intermediate portion 179. Third antenna element 182 is electromagnetically coupled to second antenna element 181 to transceive one or more RF communication bands and adds one or more lower RF communication bands when telescoping support structure 104 is in the first extended arrangement, which lower RF bands are not supported when telescoping support structure 104 is in the compact arrangement. One or more transceivers 124 are configurable to transceive in two or more RF communication bands. An antenna switching mechanism such as antenna switching/feeding network 129 configures antenna assembly 103 to support transceiving by one or more transceivers 124 according to supported RF communication bands while telescoping support structure 104 is in a corresponding one of the compact arrangement and the first extended arrangement. Alternatively, or in addition, upper left and right multi-band antennas 175a-175b may each include a fourth antenna element 183 positioned at intermediate portion 179 that moves relative to first antenna element 180.

In one or more embodiments, microphone 153 is positioned at bottom end portion 178 and audio output device 154, which includes an earpiece speaker, is positioned at top end portion 177. Antenna switching and feed network 129 configures antenna assembly 103 for use of communication device 100 while next to a head of user 146. In one or more embodiments, telescoping support structure 104 extends top end portion 177 relative to intermediate portion 179 and antenna switching and feed network 129 configures antenna assembly 103 for use of communication device 100 in a hand of user 146, away from the user's head. Communication device 100 may support multiband antennas at each corner that are reconfigured to include at least two or in some embodiments four that support low band operation. Antenna assembly 103 in most instances may mitigate blocking of one or more multiband antennas by having other multiband antennas that are not blocked.

Figure 2A:
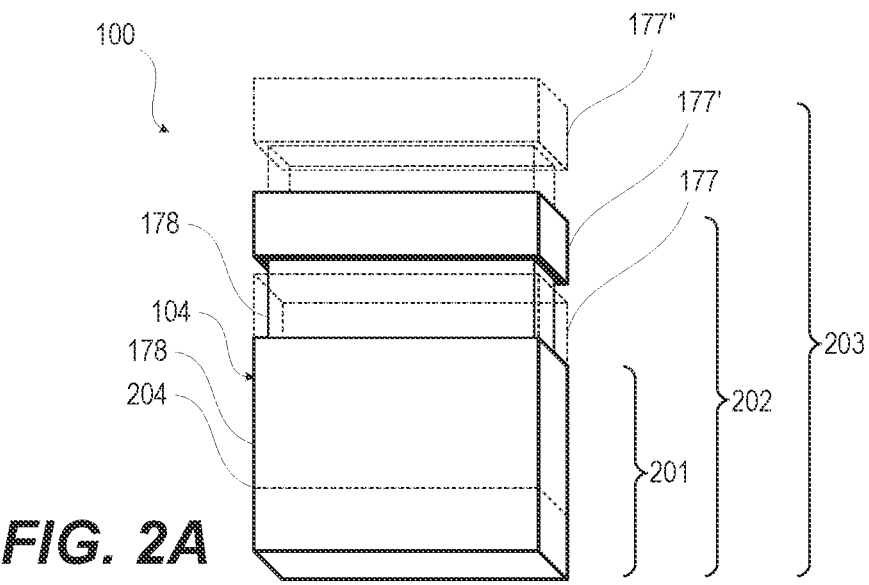
FIG. 2A is a three-dimensional view of a telescoping support structure of a handheld communication device having a top end portion positionable between a compact arrangement and an extended arrangement, according to one or more embodiments.

FIG. 2A is a three-dimensional view of telescoping support structure 104 of communication device 100 that moves from compact arrangement 201 to regular "A" arrangement 202 and further to first extended arrangement 203. In compact arrangement 201, top end portion 177 is adjacent to bottom end portion 178. In one or more embodiments, a portion of intermediate portion 179 may be exposed between top end portion 177 and bottom end portion 178 in compact arrangement 201. In one or more embodiments, top end portion 177 may be adjacent to bottom end portion 178 in compact arrangement 201, completely covering intermediate portion 179. In regular "A" arrangement 202, top end portion 177' is positioned away from bottom end portion 178 exposing intermediate portion 179. When further expanded to first extended arrangement 203, top end portion 177" is at a furthest position away from bottom end portion 178. In an example, compact arrangement 201 is useful for stowage. Regular "A" arrangement 202 is an intermediate size for handheld communications with improved antenna performance over compact arrangement 201. First extended arrangement 203 is a largest size appropriate for stationary viewing of video content. In one or more embodiments, first extended arrangement 203 enables additional space to expose high data throughput/low data latency antennas such as mmWave antenna 173 (FIG. 1). In one or more embodiments, telescoping support structure 104 also includes lower end portion 178 that can move relative to intermediate portion 179. In an example, separation 204 is between intermediate portion 179 and bottom end portion 178.

Figure 2B:
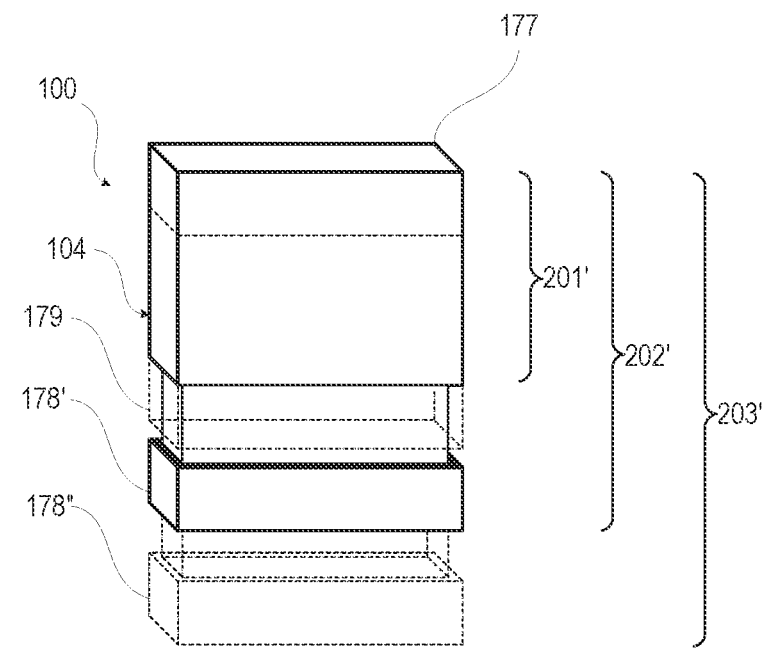
FIG. 2B is a three-dimensional view of the telescoping support structure having a bottom end portion positionable between a compact arrangement and an extended arrangement, according to one or more embodiments.

FIG. 2B is a three-dimensional view of telescoping support structure 104 of communication device 100 having bottom end portion 178 that moves from compact arrangement 201' to regular "B" arrangement 202' and further to second extended arrangement 203'. In compact arrangement 201, top end portion 177 is adjacent or at a closest supported position to bottom end portion 178. In regular arrangement 202, top end portion 177' moves to regular "B" arrangement 202' positioned away from bottom end portion 178 exposing intermediate portion 179. When further expanded to second extended arrangement 203', top end portion 177" is at a furthest position away from bottom end portion 178. In one or more embodiments, telescoping support structure 104 telescopes in both top and bottom directions.

Figures 3A, 3B:
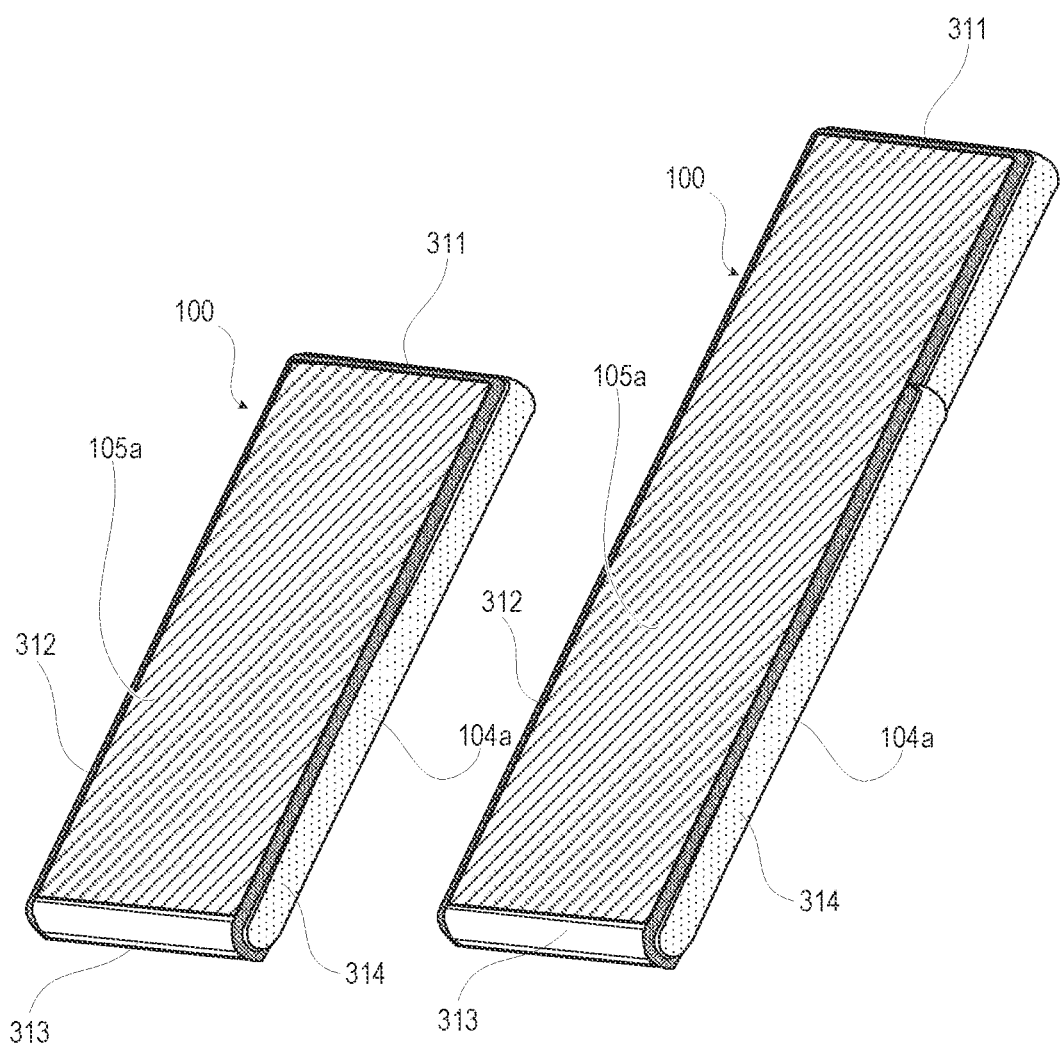
FIG. 3A is a three-dimensional view of a communication device having a telescoping support structure in a compact arrangement that supports a scrolling flexible display, according to one or more embodiments.
FIG. 3B is a three-dimensional view of the communication device of FIG. 3A having a telescoping support structure in an expanded arrangement, according to one or more embodiments.

FIG. 3A is a three-dimensional view of communication device 100 having telescoping support structure 104a in a compact arrangement that supports scrolling flexible display 105a. FIG. 3B is a three-dimensional view of communication device 100 of FIG. 3A having telescoping support structure 104a in an expanded arrangement presenting an extended length of scrolling flexible display 105a. With reference to FIGS. 3A-3B, communication device 100 has top edge 311, left edge 312, bottom edge 313, and right edge 314. Scrolling flexible display 105a engages rolling/scrolling member 111 (FIG. 1) along bottom edge 313, which limits or prevents positioning of a multiband antenna along bottom edge 313. In one or more embodiments, a communication device may include a rolling/scrolling member 111 (FIG. 1) along top edge 311, which limits or prevents positioning of a multiband antenna along top edge 311.

Figures 4A, 4B:
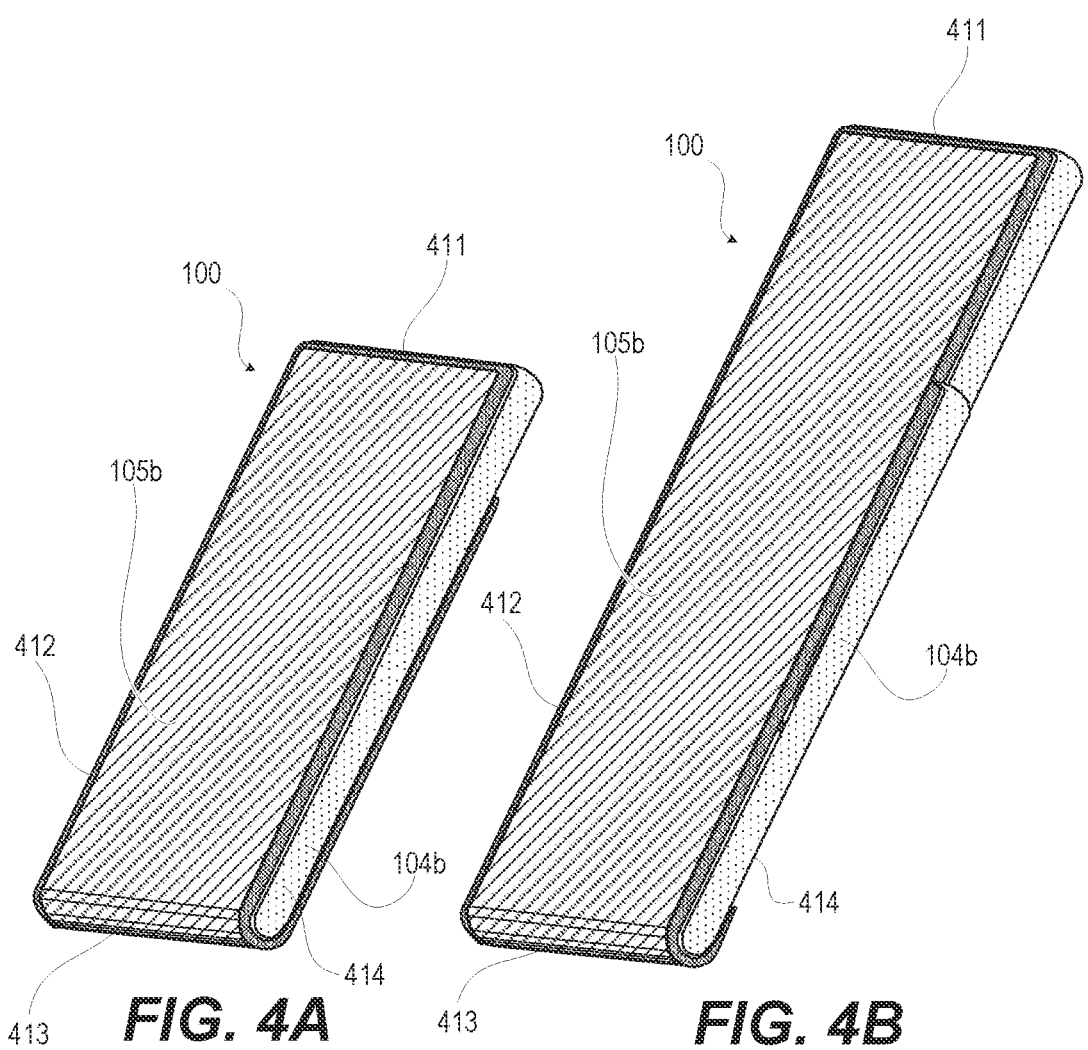
FIG. 4A is a three-dimensional view of a communication device having a telescoping support structure in a compact arrangement that supports a rolling flexible display, according to one or more embodiments.
FIG. 4B is a three-dimensional view of the communication device of FIG. 4A having a telescoping support structure in an expanded arrangement, according to one or more embodiments.

FIG. 4A is a three-dimensional view of communication device 100 having telescoping support structure 104b in a compact arrangement that supports scrolling flexible display 105b. An excess length of scrolling flexible display 105b "rolls" onto a backside of communication device 100, which limits placement of mmWave or dedicated antennas 173-174 (FIG. 1). FIG. 4B is a three-dimensional view of communication device 100 of FIG. 3A having telescoping support structure 104b in an expanded arrangement presenting an extended length of scrolling flexible display 105b. With reference to FIGS. 4A-4B, communication device 100 has top edge 411, left edge 412, bottom edge 413, and right edge 414. Rolling flexible display 105b engages rolling/scrolling member 111 (FIG. 1) along bottom edge 413, which limits or prevents positioning of a multiband antenna along bottom edge 413. In one or more embodiments, a communication device may include a rolling/scrolling member 111 (FIG. 1) along top edge 411, which limits or prevents positioning of a multiband antenna along top edge 411.

Figure 5A:
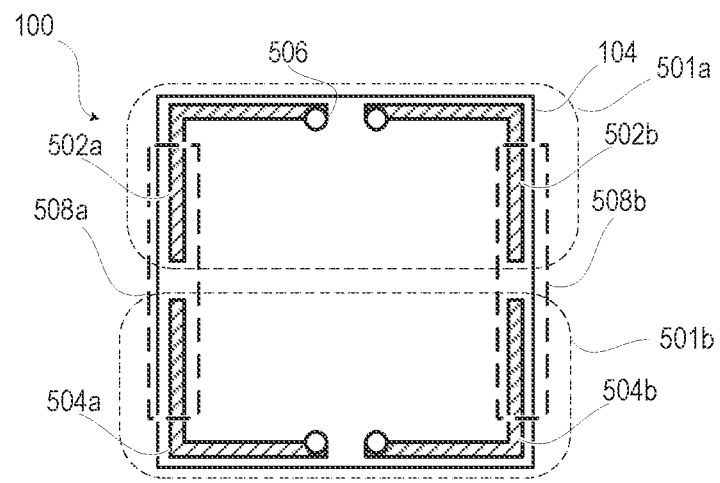
FIG. 5A is a front view of a first example communication device in a compact arrangement having L-shaped multi-band antennas at each corner that are distal end fed and grounded, according to one or more embodiments.

FIG. 5A is a front view of first example communication device 100 having telescoping support structure 104 in a compact arrangement. Antenna assembly 103 includes top pair 501a of L-shaped upper multi-band antennas 502a-502b and bottom pair 501b of lower multi-band antennas 504a-504b at each corner of telescoping support structure 104 and that are distally end fed and grounded by antenna feeds 506. Telescoping support structure 104 includes left and right mechanical rolling/expanding sides 508a-508b. The depicted feed and ground locations of each multiband antenna 502a, 502b, 504a, and 504b are examples. Each multiband antenna 502a, 502b, 504a, and 504b may receive a feed from either end or mid-point. The grounding point can be anywhere along the structure of the respective antenna structure of multiband antenna 502a, 502b, 504a, and 504b.

Figure 5B:
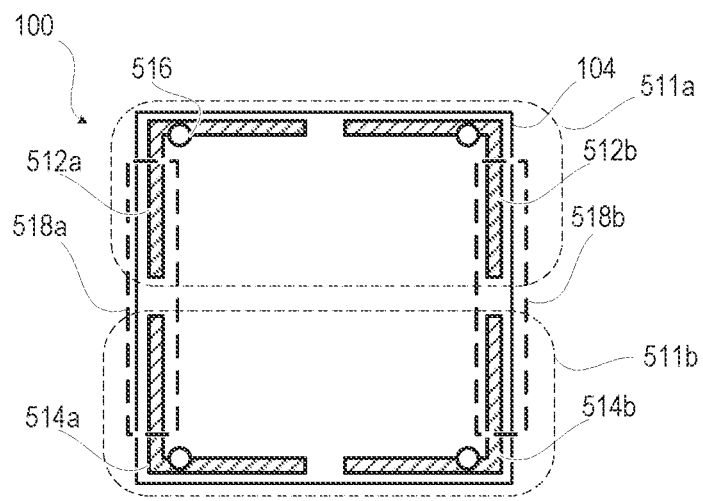
FIG. 5B is a front view of a second example communication device in a compact arrangement having L-shaped multi-band antennas at each corner that are midpoint fed and grounded, according to one or more embodiments.

FIG. 5B is a front view of second example communication device 100 having telescoping support structure 104 in a compact arrangement. Antenna assembly 103 includes top pair 511a of L-shaped upper multi-band antennas 512a-512b and bottom pair 511b of lower multi-band antennas 514a-514b at each corner of telescoping support structure 104 and that are midpoint fed and grounded by antenna feeds 516. Telescoping support structure 104 includes left and right mechanical rolling/expanding sides 518a-518b. The depicted feed and ground locations of each multiband antenna 512a, 512b, 514a, and 514b are examples. Each multiband antenna 512a, 512b, 514a, and 514b may receive a feed from either end or mid-point. The grounding point can be anywhere along the structure of the respective antenna structure of multiband antenna 512a, 512b, 514a, and 514b.

Figure 5C:
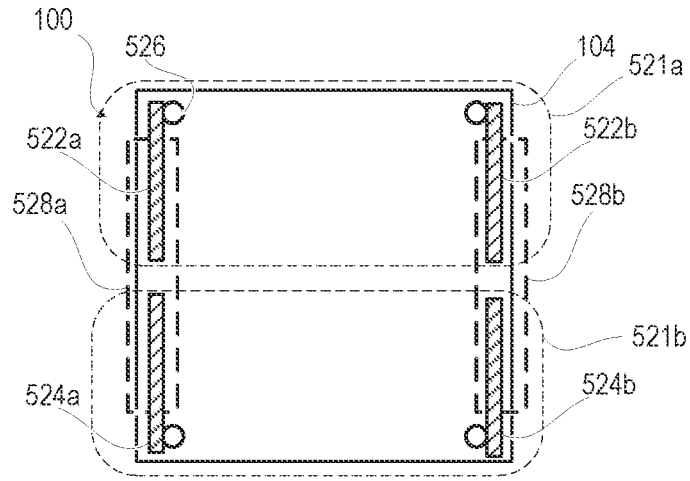
FIG. 5C is a front view of a first example communication device in a compact arrangement having four lateral side straight multi-band antennas that are distal end fed and grounded, according to one or more embodiments.

FIG. 5C is a front view of third example communication device 100 having telescoping support structure 104 in a compact arrangement. Antenna assembly 103 includes top pair 521a of straight upper multi-band antennas 522a-522b and bottom pair 521b of lower multi-band antennas 524a-524b at each corner of telescoping support structure 104 and that are endpoint fed and grounded by antenna feeds 526. Telescoping support structure 104 includes left and right mechanical rolling/expanding sides 528a-528b. The depicted feed and ground locations of each multiband antenna 522a, 522b, 524a, and 524b are examples. Each multiband antenna 522a, 522b, 524a, and 524b may receive a feed from either end. The grounding point can be anywhere along the structure of the respective antenna structure of multiband antenna 522a, 522b, 524a, and 524b.

Aspects of the present disclosure may incorporate features of any of communication devices 100 as depicted in FIGS. 5A-5C. For clarity, FIGS. 6A-6C, 7A-7D, 8A-8D, 9A-9D, and 10A-10D depict L-shaped upper multi-band antennas 602a-602b and L-shaped lower multi-band antennas 604a-604b that have identical L-shaped portions in the compact arrangement as L-shaped upper multi-band antennas 502a-502b and lower multi-band antennas 504a-504b of FIG. 5A. Communication devices 100 as depicted in FIGS. 6A-6C, 7A-7D, 8A-8D, 9A-9D, and 10A-10D depict variations in mechanically changing a length of a vertical portion of two or four of L-shaped lower multi-band antennas 604a-604b. The mechanical reconfiguration affects a respective vertical portion and not a horizontal portion of L-shaped lower multi-band antennas 604a-604b. A similar or identical mechanical reconfiguration may be implemented for L-shaped upper multi-band antennas 512a-512b and L-shaped lower multi-band antennas 514a-514b that have the same vertical portions as L-shaped upper multi-band antennas 502a-502b and lower multi-band antennas 504a-

504*b* of FIG. 5A. A similar or identical mechanical reconfiguration may also be implemented for straight upper multi-band antennas 522*a*-522*b* and lower multi-band antennas 524*a*-524*b* of FIG. 5B that have the same vertical portions as L-shaped upper multi-band antennas 502*a*-502*b* and lower multi-band antennas 504*a*-504*b* of FIG. 5A.

Figure 6A:
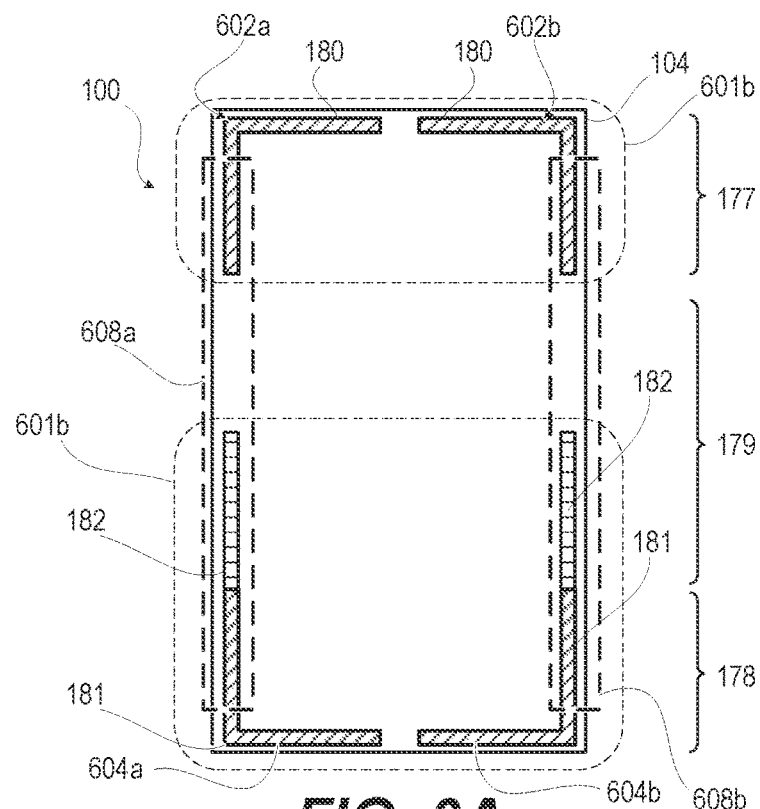
FIG. 6A is a front view of an example communication device in a bottom expanded arrangement that lengthens a bottom pair of multi-band antennas to add lower frequency band operation, according to one or more embodiments.

FIG. 6A is a front view of example communication device 100 in a bottom expanded/extended arrangement of telescoping support structure 104. Left and right mechanical rolling/expanding sides 608*a*-608*b* lengthen bottom pair 601*b* of lower multi-band antennas 604*a*-604*b* to add lower frequency band operation. Top pair 601*a* of upper multi-band antennas 602*a*-602*b* respectively include first antenna elements 180 positioned at left and right upper corners of telescoping support structure 104 on top end portion 177. Lower multi-band antennas 604*a*-604*b* respectively include second antenna elements 181 positioned at left and right lower corners of telescoping support structure 104 on bottom end portion 178 and respectively include third antenna elements 182 on left and right sides of intermediate portion 179.

Figure 6B:
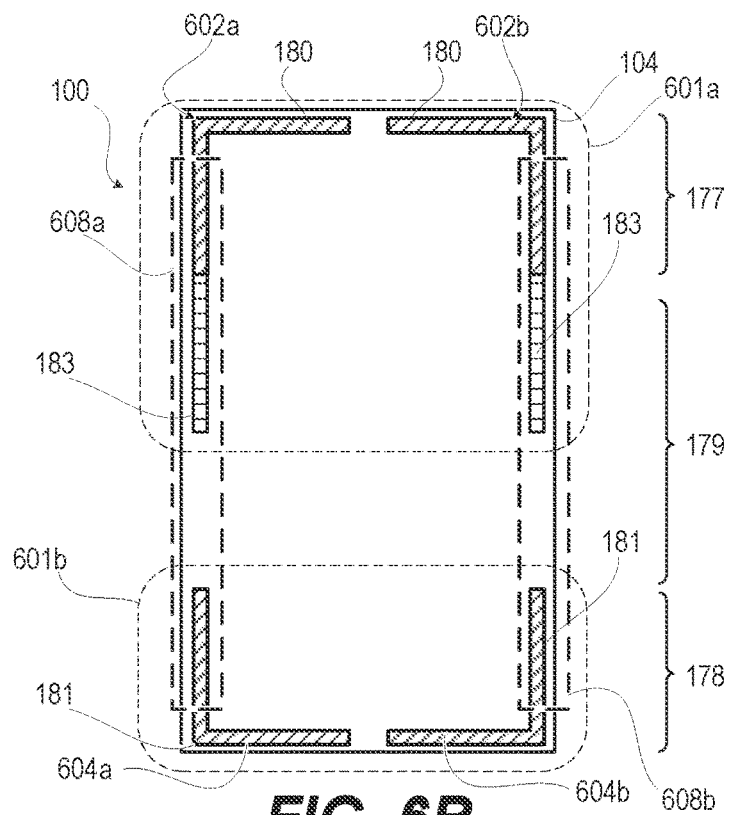
FIG. 6B is a front view of an example communication device in a top expanded arrangement that lengthens a top pair of multi-band antennas to add lower frequency band operation, according to one or more embodiments.

FIG. 6B is a front view of example communication device 100 in a top expanded/extended arrangement of telescoping support structure 104. Left and right mechanical rolling/expanding sides 608*a*-608*b* lengthen top pair 601*a* of upper multi-band antennas 602*a*-602*b* to add lower frequency band operation. Upper multi-band antennas 602*a*-602*b* respectively include first antenna elements 180 positioned at left and right upper corners of telescoping support structure 104 on top end portion 177 and include respectively fourth antenna elements 183 on left and right sides of intermediate portion 179. Bottom pair 601*b* of lower multi-band antennas 604*a*-604*b* respectively include second antenna elements 181 positioned at left and right lower corners of telescoping support structure 104 on bottom end portion 178.

Figure 6C:
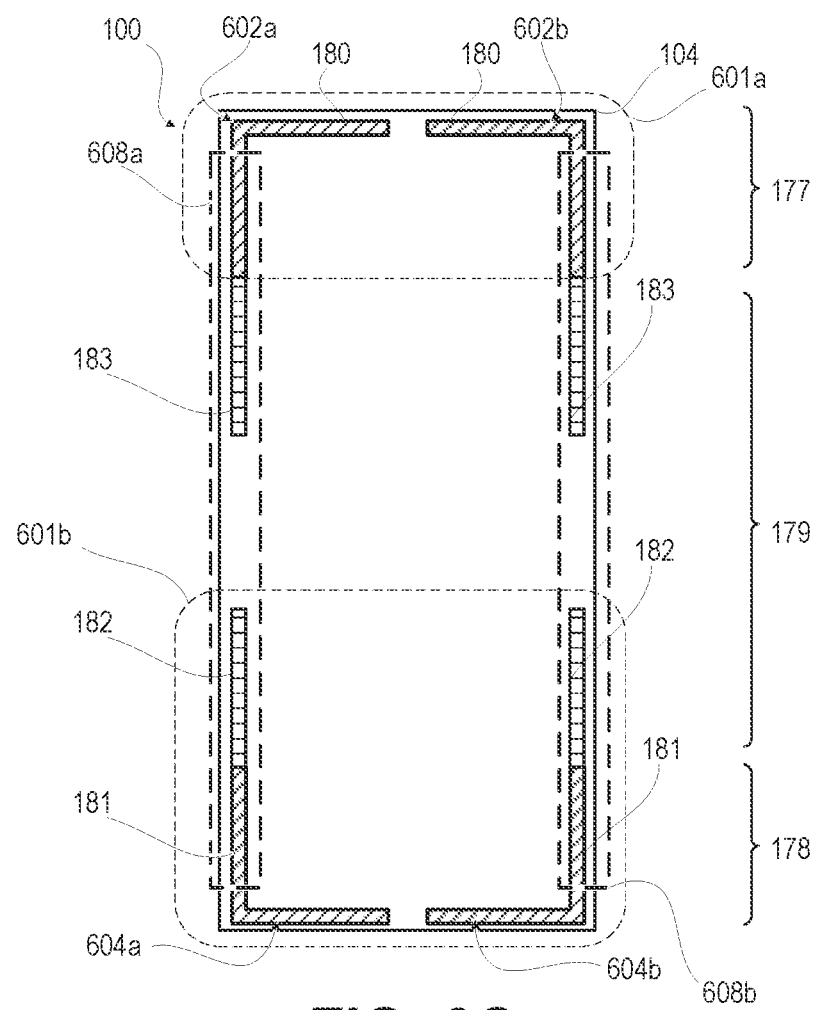
FIG. 6C is a front view of an example communication device in a top and bottom expanded arrangement that lengthens a top pair and a bottom pair of multi-band antennas to add lower frequency band operation, according to one or more embodiments.

FIG. 6C is a front view of example communication device 100 in a top and bottom expanded/extended arrangement of telescoping support structure 104. Left and right mechanical rolling/expanding sides 608*a*-608*b* lengthen top pair 601*a* of upper multi-band antennas 602*a*-602*b* and bottom pair 601*b* of lower multi-band antennas 604*a*-604*b* to add lower frequency band operation. Upper multi-band antennas 602*a*-602*b* respectively include first antenna elements 180 positioned at left and right upper corners of telescoping support structure 104 on top end portion 177 and include respectively fourth antenna elements 183 on left and right sides of intermediate portion 179. Lower multi-band antennas 604*a*-604*b* respectively include second antenna elements 181 positioned at left and right lower corners of telescoping support structure 104 on bottom end portion 178 and respectively include third antenna elements 182 on left and right sides of intermediate portion 179.

Figures 7A, 7B:
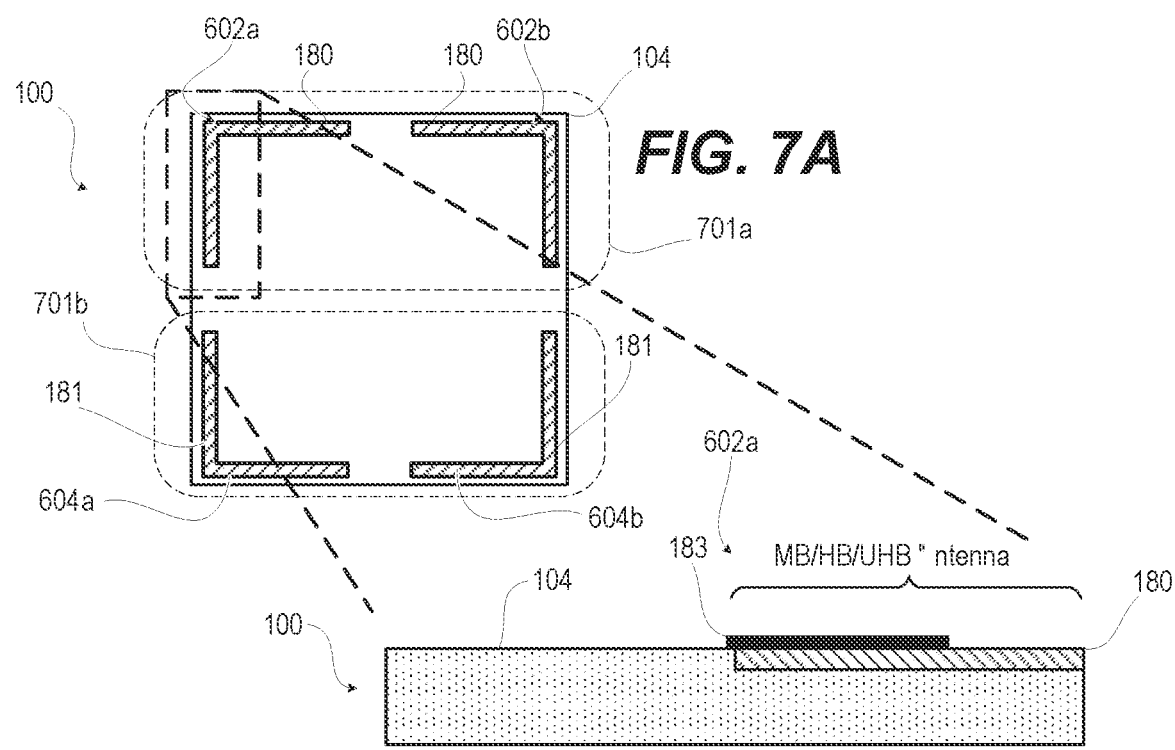
FIG. 7A is a top view of an example communication device in a compact arrangement with a top pair of four corner multiband antennas that are mechanically reconfigurable by two overlapping antenna elements in sliding contact, according to one or more embodiments.
FIG. 7B is a side detail view of one of the upper antennas of the example communication device of FIG. 7A in the compact arrangement, according to one or more embodiments.

FIG. 7A is a top view of example communication device 100 having telescoping support structure 104 in a compact arrangement with top pair 701*a* of left and right upper multiband antennas 602*a*-602*b* that are mechanically reconfigurable by having two overlapping first and fourth antenna elements 180 and 183 in sliding contact. Bottom pair 701*b* of lower multi-band antennas 604*a*-604*b* are not mechanically reconfigurable. FIG. 7B is a side detail view of left upper multiband antennas 602*a* of example communication device 100 of FIG. 7A in the compact arrangement. In the compact arrangement, left and right upper multiband antennas 602*a*-602*b* support MB, HB, and UHB. FIG. 7C is a top view of example communication device 100 of FIG. 7A in a top expanded arrangement. FIG. 7D is a side detail view of one of left upper multiband antennas 602*a* of example communication device 100 of FIG. 7C in the expanded arrangement. The sliding conductive contact between first and fourth antenna elements 180 and 183 changes a length of a portion of left and right upper multiband antennas 602*a*-602*b* to enable operation in a lower RF frequency band. In the extended arrangement, left and right upper multiband antennas 602*a*-602*b* support ULB, LB, MB, HB, and UHB.

For clarity, top pair 701*a* of left and right upper multiband antennas 602*a*-602*b* are depicted as being mechanically reconfigurable. Alternatively, or in addition, bottom pair 701*b* of left and right lower multiband antennas 604*a*-604*b* may be mechanically reconfigurable in a similar manner. To generalize, according to aspects of the present disclosure, "at least one first antenna" of either top pair 701*a* or bottom pair 701*b* includes first antenna element that may or may not be mechanically reconfigurable. When mechanically configurable, fourth antenna element is included in each of the at least one first antenna. In addition, "at least one second antenna" of the corresponding remaining one of top pair 701*a* or bottom pair 701*b* is mechanically reconfigurable by including second and third antenna elements 180 and 183. In FIGS. 7A-7D, the at least one second antenna corresponds to top pair 701*a* of left and right upper multiband antennas 602*a*-602*b*.

In one or more particular embodiments, the at least one second antenna (602*a*-602*b*) is either an inverted "L" antenna (ILA) or an inverted "F" antenna (IFA) type antenna having a first end open that is fed by the at least one transceiver. Second antenna element (180) is in sliding conductive contact or electromagnetically coupled with third antenna element (183) to change a length of a portion of the at least one second antenna (602*a*-602*b*).

Alternatively, in one or more particular embodiments, the at least one second antenna (602*a*-602*b*) is a loop type antenna having a first end open that is fed by the at least one transceiver and a second end grounded to a transceiver ground of the at least one transceiver. The second antenna element (180) is in sliding conductive contact or electromagnetically coupled with the third antenna element to change a length of a portion of the at least one second antenna. to change a length of a portion of the at least one second antenna (602*a*-602*b*).

FIG. 8A is a top view of example communication device 100 in a compact arrangement with top pair 801*a* of left and right upper multiband antennas 602*a*-602*b* that are mechanically reconfigurable by having two overlapping first and fourth antenna elements 180 and 183 in parallel alignment with a controllable gap. Bottom pair 801*b* of lower multi-band antennas 604*a*-604*b* are not mechanically reconfigurable. FIG. 8B is a side detail view of left upper multiband antenna 602*a* of example communication device 100 of FIG. 8A in the compact arrangement. In the compact arrangement, left and right upper multiband antennas 602*a*-602*b* support MB, HB, and UHB. FIG. 8C is a top view of the example communication device of FIG. 8A in a top expanded arrangement of a top pair of four corner multiband antennas that are mechanically reconfigurable. FIG. 8D is a side detail view of left upper multiband antenna 602*a* of example communication device 100 of FIG. 8C in the expanded arrangement. Top pair 801*a* of left and right upper multiband antennas 602*a*-602*b* (i.e., "at least one second antenna" as generalized above) are coupled loop type antennas configured as one of an inverted "L" antenna (ILA) and an inverted "F" antenna (IFA) type antenna. Second antenna element (180) has a first end open that is fed by the at least one transceiver. Third antenna element (183) is in parallel alignment with, and spaced by an air gap away from, a second end grounded to a transceiver ground of the at least one transceiver. The third antenna element (183) telescopes in length in relation to a position of the telescoping support structure to change a length of a portion of the at least one second antenna (i.e., each of top pair 801a). In the extended arrangement, left and right upper multiband antennas 602a-604b support ULB, LB, MB, HB, and UHB. First antenna element 180 telescopes in length in relation to a position of telescoping support structure 104 to change an effective electrical length of left upper multiband antenna 602a.

Figures 9A, 9B:
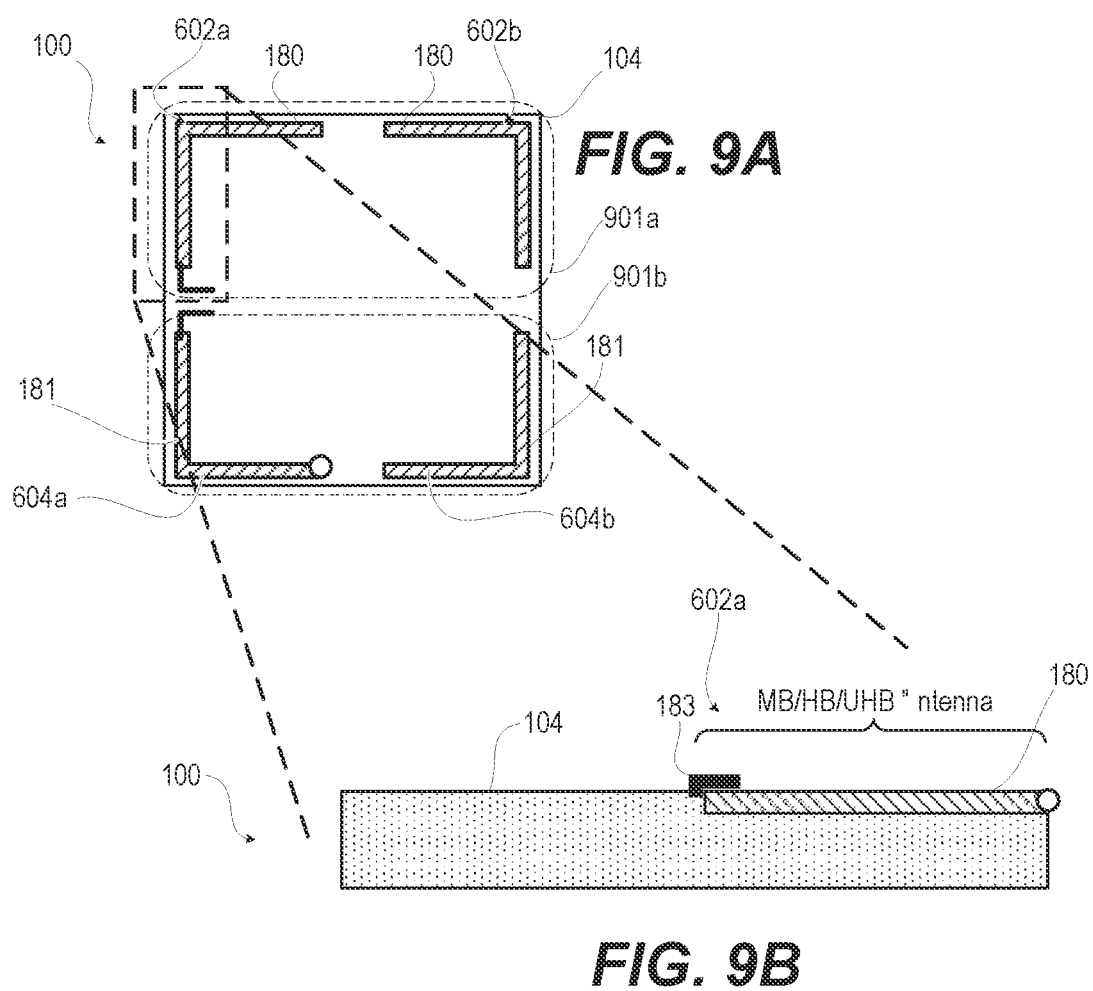
FIG. 9A is a top view of an example communication device in a compact arrangement with a top pair of four corner multiband antennas that are mechanically reconfigurable by end grounding one antenna element to another antenna element, according to one or more embodiments.
FIG. 9B is a side detail view of one of the upper antennas of the example communication device of FIG. 9A in the compact arrangement, according to one or more embodiments.

FIG. 9A is a top view of example communication device 100 in a compact arrangement with top pair 901a of left and right upper multiband antennas 602a-602b that are mechanically reconfigurable by end grounding first antenna element 180 to fourth antenna element 183. Bottom pair 901b of lower multi-band antennas 604a-604b are not mechanically reconfigurable. FIG. 9B is a side detail view of left upper multiband antenna 602a of example communication device 100 of FIG. 9A in the compact arrangement. In the compact arrangement, left and right upper multiband antennas 602a-604b support MB, HB, and UHB as a loop type antenna fed from the non-expanding end. Loop type antenna is around a half wavelength of MB/HB/UHB. FIG. 9C is a top view of example communication device 100 of FIG. 9A in a top expanded arrangement of left and right upper multiband antennas 602a-604b that are mechanically reconfigurable by spacing first antenna element 180 from fourth antenna element 183 so that there is no conductive contact or capacitive coupling. FIG. 9D is a side detail view of left upper multiband antenna 602a of example communication device 100 of FIG. 9C in the extended arrangement. In the extended arrangement, left and right upper multiband antennas 602a-604b support ULB, LB, MB, HB, and UHB. ILA/IFA type antenna is around a quarter wavelength of ULB and LB. The detached shorted end of fourth antenna element 183 can be left as a coupling antenna or be mechanically shorted.

To generalize in a similar as described above for embodiments of communication device 100 in FIGS. 7A-7D and 8A—8D, the at least one second antenna (i.e., top pair 901a of eft and right upper multiband antennas 602a-604b) is a loop type antenna having a first end open that is fed by the at least one transceiver and a second end grounded to a transceiver ground of the at least one transceiver. The second antenna element (180) is in detached from the third antenna element (183) configuring an antenna type of the at least one second antenna (901a) to an inverted "L" antenna (ILA). This change from a loop antenna to an ILA antenna effectively changes electrical length of the at least one second antenna (901a).

FIG. 10A is a top view of example communication device 100 in a compact arrangement of telescoping support structure 104 with four corner multiband antennas provided by top pair of left and right upper multiband antennas 602a-602b and bottom pair of left and right lower multiband antennas 604a-604b. In addition, communication device 100 includes GPS antenna 1003, left and right Wi-Fi antennas 1005a-1005b, NFC antenna 1007, left and right mmWave antennas 1009a-1009b, and UWB antenna 1011.

FIG. 10B is a front view of example communication device 100 of FIG. 10A in a bottom expanded arrangement ("Regular A" arrangement) of telescoping support structure 104 that lengthens left and right lower multiband antennas 604a-604b to add lower frequency band operation. With antennas that support LB being at the bottom of the communication device 100, regular "A" arrangement is intended for head use cases. The user's head is toward the top of the communication device 100 away from the LB antennas.

FIG. 10C is a front view of example communication device 100 of FIG. 10A in a top expanded arrangement ("Regular B" arrangement) of telescoping support structure 104 that lengthens a top pair of left and right upper multiband antennas 602a-602b to add lower frequency band operation. With low band antennas toward the top of the communication device 100, regular "B" arrangement is intended for hand use cases. The user generally holds communication device 100 with the user's hands toward the bottom and away from the low band antennas.

Figure 10D:
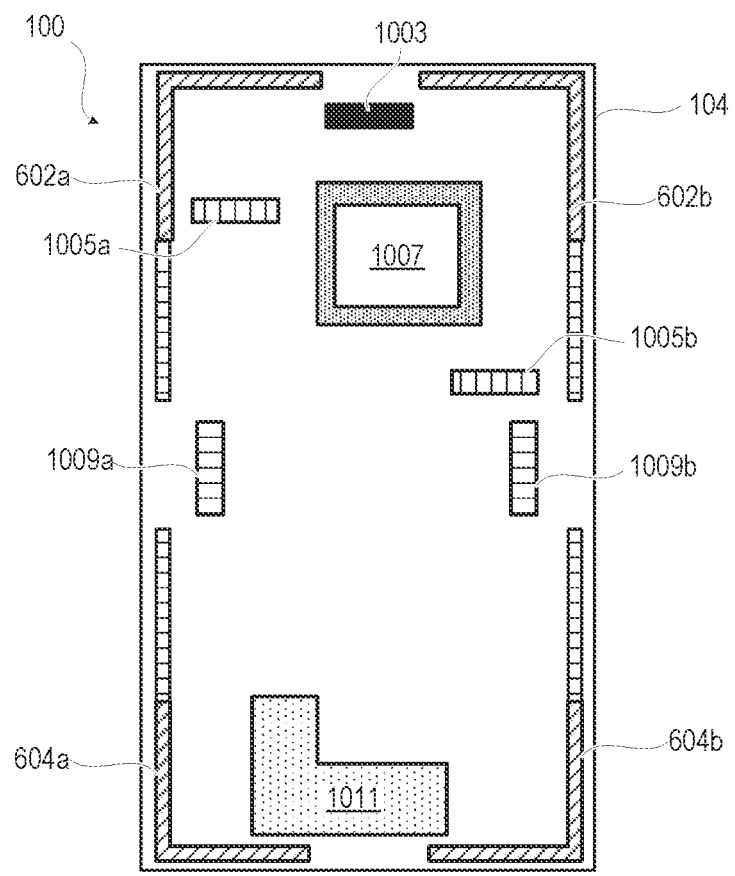
FIG. 10D is a front view of an example communication device of FIG. 10A in a top and bottom expanded arrangement that lengthens a top pair and a bottom pair of multi-band antennas to add lower frequency band operation, according to one or more embodiments.

FIG. 10D is a front view of example communication device 100 of FIG. 10A in a top and bottom expanded arrangement ("extended" arrangement) of telescoping support structure 104 that lengthens a top pair of left and right upper multiband antennas 602a-602b and a bottom pair of left and right lower multiband antennas 604a-604b to add lower frequency band operation. Extended arrangement is intended for presenting video content that benefits from the largest screen size and provides enhanced space for antennas to minimize intra-antenna interference.

Figure 11:
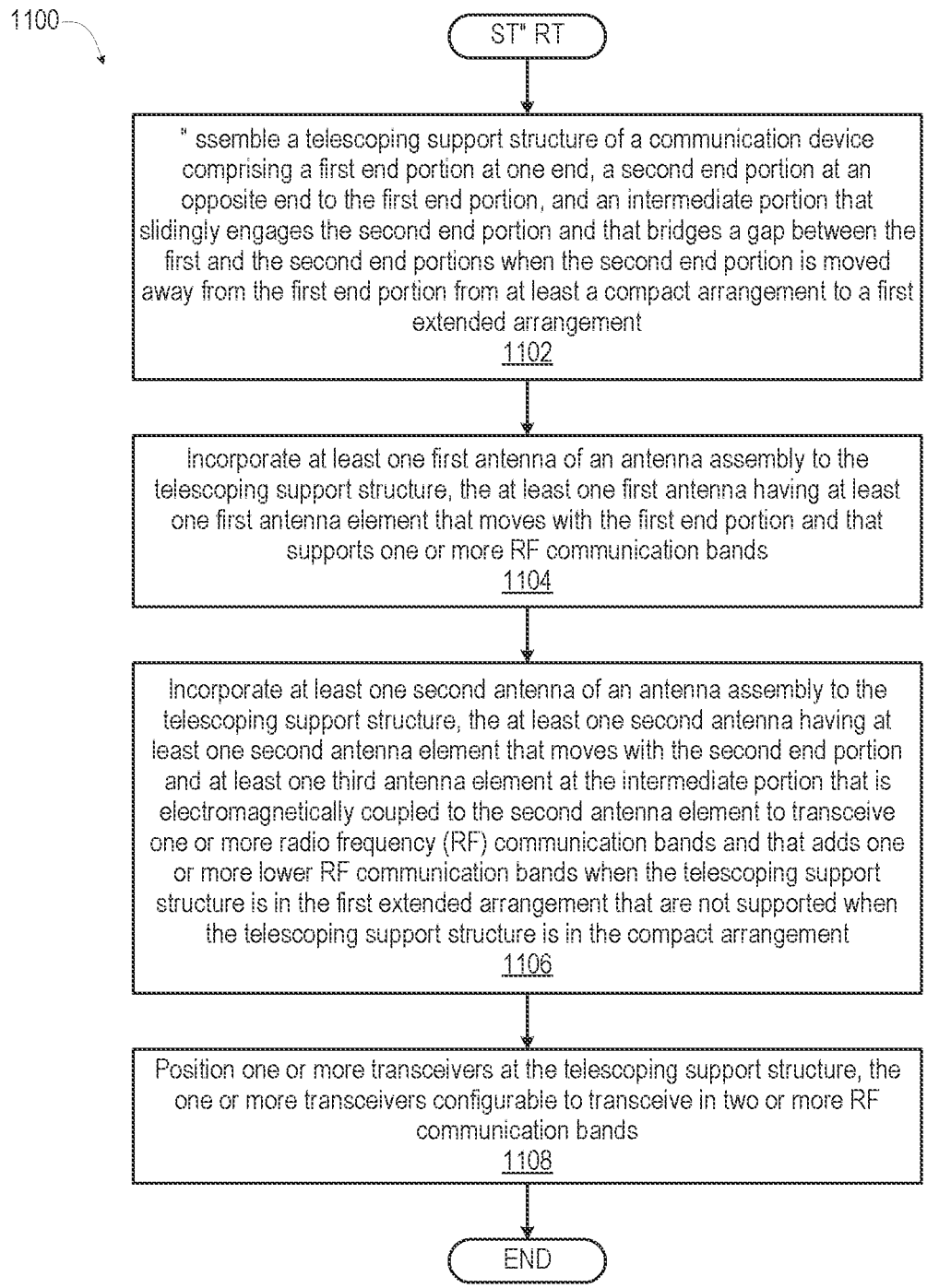
FIG. 11 is a flow diagram presenting a method performed by an automated manufacturing system to produce a communication device having antennas incorporated into a rolling or a scrolling display form factor, according to one or more embodiments.

FIG. 11 is a flow diagram presenting method 1100 performed by an automated manufacturing system to produce a communication device having antennas incorporated into rolling or scrolling display form factor. The description of method 1100 is provided with general reference to the specific components illustrated within the preceding FIGS. 1-2, 3A-3B, 4A-4B, 5A-5C, 6A-6C, 7A-7D, 8A-8D, 9A-9D, and 10A-10D. Specific components referenced in method 1100 (FIG. 11) may be identical or similar to components of the same name used in describing preceding FIGS. 1-2, 3A-3B, 4A-4B, 5A-5C, 6A-6C, 7A-7D, 8A-8D, 9A-9D, and 10A-10D. In one or more embodiments, controller 101 configures an automated manufacturing system that may have some similar hardware components to communication device 100 (FIG. 1) to provide the described functionality of method 1100 (FIG. 11).

With reference to FIG. 11, method 1100 includes assembling a telescoping support structure of a communication device comprising a first end portion at one end, a second end portion at an opposite end to the first end portion, and an intermediate portion that slidingly engages the second end portion and that bridges a gap between the first and the second end portions when the second end portion is moved away from the first end portion from at least a compact arrangement to a first extended arrangement (block 1102). Method 1100 includes incorporating at least one first antenna of an antenna assembly to the telescoping support structure, the at least one first antenna having at least one first antenna element that moves with the first end portion and that supports one or more RF communication bands (block 1104). Method 1100 includes incorporating at least one second antenna of an antenna assembly to the telescoping support structure, the at least one second antenna having at least one second antenna element that moves with the second end portion and at least one third antenna element at the intermediate portion that is one of electromagnetically coupled and electrical conduction coupled to the second antenna element to transceive one or more radio frequency (RF) communication bands and that adds one or more lower RF communication bands when the telescoping support structure is in the first extended arrangement that are not supported when the telescoping support structure is in the compact arrangement (block 1106). Method 1100 includes positioning one or more transceivers at the telescoping support structure, the one or more transceivers configurable to transceive in two or more RF communication bands (block 1108). Then method 1100 ends.

In one or more embodiments, method 1100 includes electrically connecting an antenna switching mechanism between the antenna assembly and the one or more transceivers, the antenna switching mechanism to configure the antenna assembly to support transceiving by the one or more transceivers according to supported RF communication bands while the telescoping support structure is in a corresponding one or the compact arrangement and the first extended arrangement.

In one or more embodiments, method 1100 includes positioning a left first antenna of the at least one first antenna on a left lateral side of the telescoping support structure and a right first antenna of the at least one first antenna on a right lateral side of the telescoping support structure. Method 1100 includes positioning a left second antenna of the at least one second antenna on the left lateral side of the telescoping support structure and positioning a right second antenna of the at least one second antenna on the right lateral side of the telescoping support structure.

In one or more embodiments, method 1100 includes positioning a microphone at the first end portion that is a bottom portion of the communication device. Method 1100 includes positioning, at the second end portion, an earpiece speaker configured for providing audio output to an ear of a user. In one or more embodiments, the first end portion is a top portion of the communication device. The first extended position of the telescoping support structure is intended for in hand use by a user.

In one or more embodiments, the intermediate portion slidingly engages the first end portion and further bridges the gap between the first and the second end portions when the first end portion is moved relative to the intermediate portion from the compact arrangement to at least a second extended arrangement. The at least one first antenna of the antenna assembly has at least one fourth antenna element at the intermediate portion that is electromagnetically coupled to the first antenna element at the first end portion to operate in one or more radio frequency (RF) communication bands and that adds one or more lower RF communication bands in the second extended arrangement, which lower RF communication bands that are not supported in the compact arrangement.

In one or more embodiments, method 1100 includes assembling one of: (i) a scrollable display; and (ii) a rollable display supported between the first end portion and the second end portion of the telescoping support structure. In one or more embodiments, the at least one second antenna assembly supports medium band (MB), high band (HB) and ultra-high band (UHB) while the telescoping support structure is in the compact arrangement and supports low band (LB), MB, HB, and UHB while the telescoping support structure is in the first extended arrangement.

In one or more particular embodiments, the at least one second antenna is either an inverted "L" antenna (ILA) or an inverted "F" antenna (IFA) type antenna having a first end open that is fed by the at least one transceiver. The second antenna element is in sliding conductive contact or is electromagnetically coupled with the third antenna element to change a length of a portion of the at least one second antenna.

In one or more particular embodiments, the at least one second antenna is a loop type antenna having a first end open that is fed by the at least one transceiver and a second end grounded to a transceiver ground of the at least one transceiver. The second antenna element is in sliding conductive contact or electromagnetically coupled with the third antenna element to change a length of a portion of the at least one second antenna.

In one or more particular embodiments, the at least one second antenna is a coupled loop type antenna configured as one of an inverted "L" antenna (ILA) and an inverted "F" antenna (IFA) type antenna. The second antenna element has a first end open that is fed by the at least one transceiver. The third antenna element is in parallel alignment with, and spaced by an air gap away from, a second end grounded to a transceiver ground of the at least one transceiver. The third antenna element telescopes in length in relation to a position of the telescoping support structure to change a length of the at least one second antenna.

In one or more particular embodiments, the at least one second antenna is a loop type antenna having a first end open that is fed by the at least one transceiver and a second end grounded to a transceiver ground of the at least one transceiver. The second antenna element is in detached from the third antenna element configuring an antenna type of the at least one second antenna to an inverted "L" antenna (ILA), effectively changes electrical length of the at least one second antenna.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation is not limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
   a telescoping support structure comprising a first end portion at one end, a second end portion at an opposite end to the first end portion, and an intermediate portion that slidingly engages the second end portion and that bridges a gap between the first and the second end portions when the second end portion is moved away from the first end portion from at least a compact arrangement to a first extended arrangement;
   an antenna assembly comprising: (i) at least one first antenna having at least one first antenna element that moves with the first end portion and that supports one or more RF communication bands; and (ii) at least one second antenna having at least one second antenna element that moves with the second end portion and at least one third antenna element at the intermediate portion that is one of electromagnetically coupled and electrical conduction coupled to the second antenna element to transceive one or more radio frequency (RF) communication bands and that adds one or more lower RF communication bands when the telescoping support structure is in the first extended arrangement that are not supported when the telescoping support structure is in the compact arrangement;
   one or more transceivers configurable to transceive in two or more RF communication bands; and an antenna switching mechanism that configures the antenna assembly to support transceiving by the one or more transceivers according to supported RF communication bands while the telescoping support structure is in a corresponding one of the compact arrangement and the first extended arrangement.

2. The communication device of claim 1, wherein:
   the at least one first antenna comprises a left first antenna on a left lateral side of the telescoping support structure and a right first antenna on a right lateral side of the telescoping support structure; and
   the at least one second antenna comprises a left second antenna on the left lateral side of the telescoping support structure and a right second antenna on the right lateral side of the telescoping support structure.

3. The communication device of claim 1, wherein:
   the first end portion is a bottom portion of the communication device and comprises a microphone;
   the second end portion comprises an earpiece speaker configured for providing audio output to an ear of a user.

4. The communication device of claim 1, wherein the first end portion is a top portion of the communication device, wherein the first extended arrangement of the telescoping support structure is intended for in hand use by a user.

5. The communication device of claim 1, wherein:
   the intermediate portion slidingly engages the first end portion and further bridges the gap between the first and the second end portions when the first end portion is moved relative to the intermediate portion from the compact arrangement to at least a second extended arrangement; and
   the at least one first antenna of the antenna assembly has at least one fourth antenna element at the intermediate portion that is one of electromagnetically coupled and electrical conduction coupled to the first antenna element at the first end portion to operate in one or more radio frequency (RF) communication bands and that adds one or more lower RF communication bands in the second extended arrangement that are not supported in the compact arrangement.

6. The communication device of claim 1, further comprising one of: (i) a scrollable display; and (ii) a rollable display supported between the first end portion and the second end portion of the telescoping support structure.

7. The communication device of claim 1, wherein the at least one second antenna assembly supports medium band (MB), high band (HB) and ultra-high band (UHB) while the telescoping support structure is in the compact arrangement and supports low band (LB), MB, HB, and UHB while the telescoping support structure is in the first extended arrangement.

8. The communication device of claim 1, wherein the at least one second antenna comprises either an inverted "L" antenna (ILA) or an inverted "F" antenna (IFA) type antenna having a first end open that is fed by the at least one transceiver, wherein the second antenna element is in sliding conductive contact or electromagnetically coupled with the third antenna element to change a length of a portion of the at least one second antenna.

9. The communication device of claim 1, wherein the at least one second antenna comprises a loop type antenna having a first end open that is fed by the at least one transceiver and a second end grounded to a transceiver ground of the at least one transceiver, wherein the second antenna element is in sliding conductive contact or is electromagnetically coupled with the third antenna element to change a length of a portion of the at least one second antenna.

10. The communication device of claim 1, wherein the at least one second antenna comprises a coupled loop type antenna configured as one of an inverted "L" antenna (ILA) and an inverted "F" antenna (IFA) type antenna wherein the second antenna element, having a first end open that is fed by the at least one transceiver and, wherein the third antenna element is in parallel alignment with, and spaced by an air gap away from, a second end grounded to a transceiver ground of the at least one transceiver, the third antenna element telescoping in length in relation to a position of the telescoping support structure to change the length of the at least one second antenna.

11. The communication device of claim 1, wherein the at least one second antenna comprises a loop type antenna having a first end open that is fed by the at least one transceiver and a second end grounded to a transceiver ground of the at least one transceiver, wherein the second antenna element is in detached from the third antenna element configuring an antenna type of the at least one second antenna to an inverted "L" antenna (ILA), effectively changing electrical length of the at least one second antenna.

12. A method comprising:
assembling a telescoping support structure of a communication device comprising a first end portion at one end, a second end portion at an opposite end to the first end portion, and an intermediate portion that slidingly engages the second end portion and that bridges a gap between the first and the second end portions when the second end portion is moved away from the first end portion from at least a compact arrangement to a first extended arrangement;
incorporating an antenna assembly to the telescoping support structure, the antenna assembly comprising: (i) at least one first antenna having at least one first antenna element that moves with the first end portion and that supports one or more RF communication bands; and (ii) at least one second antenna having at least one second antenna element that moves with the second end portion and at least one third antenna element at the intermediate portion that is one of electromagnetically coupled and electrical conduction coupled to the second antenna element to transceive one or more radio frequency (RF) communication bands and that adds one or more lower RF communication bands when the telescoping support structure is in the first extended arrangement that are not supported when the telescoping support structure is in the compact arrangement; and
positioning one or more transceivers at the telescoping support structure, the one or more transceivers configurable to transceive in two or more RF communication bands.

13. The method of claim 12, further comprising:
positioning a left first antenna of the at least one first antenna on a left lateral side of the telescoping support structure and a right first antenna of the at least one first antenna on a right lateral side of the telescoping support structure; and
positioning a left second antenna of the at least one second antenna on the left lateral side of the telescoping support structure and positioning a right second antenna of the at least one second antenna on the right lateral side of the telescoping support structure.

14. The method of claim 12, further comprising:
positioning a microphone at the first end portion that is a bottom portion of the communication device; and
positioning, at the second end portion, an earpiece speaker configured for providing audio output to an ear of a user.

15. The method of claim 12, wherein:
the intermediate portion slidingly engages the first end portion and further bridges the gap between the first and the second end portions when the first end portion is moved relative to the intermediate portion from the compact arrangement to at least a second extended arrangement; and
the at least one first antenna of the antenna assembly has at least one fourth antenna element at the intermediate portion that is one of electromagnetically coupled and electrical conduction coupled to the first antenna element at the first end portion to operate in one or more radio frequency (RF) communication bands and that adds one or more lower RF communication bands in the second extended arrangement that are not supported in the compact arrangement.

16. The method of claim 12, further comprising assembling one of: (i) a scrollable display; and (ii) a rollable display supported between the first end portion and the second end portion of the telescoping support structure, wherein the at least one second antenna assembly supports medium band (MB), high band (HB) and ultra-high band (UHB) while the telescoping support structure is in the compact arrangement and supports low band (LB), MB, HB, and UHB while the telescoping support structure is in the first extended arrangement.

17. The method of claim 12, wherein the at least one second antenna comprises either an inverted "L" antenna (ILA) or an inverted "F" antenna (IFA) type antenna having a first end open that is fed by the at least one transceiver, wherein the second antenna element is in sliding conductive contact or electromagnetically coupled with the third antenna element to change a length of a portion of the at least one second antenna.

18. The method of claim 12, wherein the at least one second antenna comprises a loop type antenna having a first end open that is fed by the at least one transceiver and a second end grounded to a transceiver ground of the at least one transceiver, wherein the second antenna element is in sliding conductive contact or electromagnetically coupled with the third antenna element to change a length of a portion of the at least one second antenna.

19. The method of claim 12, wherein the at least one second antenna comprises a coupled loop type antenna configured as one of an inverted "L" antenna (ILA) and an inverted "F" antenna (IFA) type antenna wherein the second antenna element, having a first end open that is fed by the at least one transceiver and, wherein the third antenna element is in parallel alignment with, and spaced by an air gap away from, a second end grounded to a transceiver ground of the at least one transceiver, the third antenna element telescoping in length in relation to a position of the telescoping support structure to change a length of the at least one second antenna.

20. The method of claim 12, wherein the at least one second antenna comprises a loop type antenna having a first end open that is fed by the at least one transceiver and a second end grounded to a transceiver ground of the at least one transceiver, wherein the second antenna element is detached from the third antenna element configuring an antenna type of the at least one second antenna to an inverted "L" antenna (ILA), effectively changing electrical length of the at least one second antenna.

* * * * *